(12) United States Patent
Akashika

(10) Patent No.: US 12,079,322 B2
(45) Date of Patent: Sep. 3, 2024

(54) AUTHENTICATION SYSTEM AND AUTHENTICATION METHOD

(71) Applicant: Rakuten Group, Inc., Tokyo (JP)

(72) Inventor: Hideki Akashika, Tokyo (JP)

(73) Assignee: Rakuten Group, Inc., Tokyo (JP)

( * ) Notice: Subject to any disclaimer, the term of this patent is extended or adjusted under 35 U.S.C. 154(b) by 323 days.

(21) Appl. No.: 17/597,157

(22) PCT Filed: Dec. 28, 2020

(86) PCT No.: PCT/JP2020/049149
§ 371 (c)(1),
(2) Date: Dec. 28, 2021

(87) PCT Pub. No.: WO2022/144982
PCT Pub. Date: Jul. 7, 2022

(65) Prior Publication Data
US 2023/0139948 A1 May 4, 2023

(51) Int. Cl.
*G06F 21/34* (2013.01)
*G06F 21/31* (2013.01)

(52) U.S. Cl.
CPC ............ *G06F 21/34* (2013.01); *G06F 21/316* (2013.01)

(58) Field of Classification Search
None
See application file for complete search history.

(56) References Cited

U.S. PATENT DOCUMENTS

| 9,947,007 B2 * | 4/2018 | Greenbaum | G06Q 20/00 |
| 10,872,345 B1 * | 12/2020 | Walters | G06Q 20/204 |
| 2016/0267486 A1 * | 9/2016 | Mitra | G07F 7/0846 |
| 2017/0185725 A1 * | 6/2017 | Darling | G16H 40/20 |
| 2018/0082303 A1 * | 3/2018 | Chan-Bauza | G06Q 20/4016 |
| 2021/0241266 A1 * | 8/2021 | Kamal | G06Q 20/40145 |

FOREIGN PATENT DOCUMENTS

| CN | 102930435 A | * | 2/2013 |
| JP | 2004-5255 A | | 1/2004 |
| JP | 2019-071006 A | | 5/2019 |
| JP | 2020-123069 A | | 8/2020 |

OTHER PUBLICATIONS

International Search Report for PCT/JP2020/049149, dated Mar. 30, 2021.

* cited by examiner

*Primary Examiner* — Benjamin E Lanier
(74) *Attorney, Agent, or Firm* — Sughrue Mion, PLLC

(57) ABSTRACT

Input information acquisition means (101, 201) of an authentication system (S) acquires input information, which accompanies a card possessed by a user, and has been input from a user terminal through use of reading means (33A) or photographing means (36). Identification information acquisition means (102, 202) acquires identification information that enables identification of the card. Registered information acquisition means (105, 203) acquires registered information, which accompanies the card, and has been registered in a server in association with the identification information in advance. Authentication means (103) executes authentication based on the input information and the registered information.

10 Claims, 12 Drawing Sheets

FIG.7

| USER ACCOUNT | PASSWORD | FULL NAME | CARD INFORMATION | | |
|---|---|---|---|---|---|
| | | | CARD NUMBER | EXPIRATION DATE | FULL NAME |
| u00001 | ******** | TARO YAMADA | 1234567890123456 | 2021/5/31 | TARO YAMADA |
| u00002 | ****** | HANAKO SUZUKI | 1252330948930943 | 2021/6/30 | HANAKO SUZUKI |
| u00003 | ********** | JIRO KIMURA | 7190193950001321 | 2022/10/31 | ZIRO KIMURA |
| ⋮ | ⋮ | ⋮ | ⋮ | ⋮ | ⋮ |

| CARD INFORMATION | | | | REGISTERED ID NUMBER |
|---|---|---|---|---|
| CARD NUMBER | EXPIRATION DATE | FULL NAME | ... | |
| 1234567890123456 | 2021/5/31 | TARO YAMADA | ... | ABCD9876E543F210 |
| 1252330948930943 | 2021/6/30 | HANAKO SUZUKI | ... | AATR1234FF62G190 |
| 7190193950001321 | 2022/10/31 | JIRO KIMURA | ... | EA12GT0098TF7T65 |
| ... | ... | ... | ... | ... |

US 12,079,322 B2

AUTHENTICATION SYSTEM AND AUTHENTICATION METHOD

CROSS REFERENCE TO RELATED APPLICATIONS

This application is a National Stage of International Application No. PCT/JP2020/049149 filed Dec. 28, 2020.

TECHNICAL FIELD

The present disclosure relates to an authentication system, an authentication method, and a program.

BACKGROUND ART

Hitherto, in order to prevent a malicious third party from committing a fraud, there has been known a technology relating to possession authentication utilizing a card possessed by a user. For example, in Patent Literature 1, there is described a technology for executing authentication by determining whether or not card face information obtained from an image obtained by photographing a card face of a card and card information obtained from magnetism or an electric circuit of the card match. The card face information, for example, a graphic form or a hologram, which cannot be directly compared to the card information, is converted into information that can be compared to the card information, and is compared thereto.

CITATION LIST

Patent Literature

[PTL 1] JP 2019-071006 A

SUMMARY OF INVENTION

Technical Problem

However, with the technology of Patent Literature 1, the authentication is executed by comparing two pieces of information obtained from the card to each other, and hence the authentication is completed based only on the information included in the card. For that reason, when a malicious third party forges a card with illegally obtained card information printed on a card face thereof and embeds the card information in a magnetic portion or an electric circuit of the forged card, the authentication is completed based only on the information in the forged card, and a fraud cannot be detected. As a result, with the technology of Patent Literature 1, it has not been possible to sufficiently improve security in possession authentication.

An object of the present disclosure is to enhance security in possession authentication.

Solution to Problem

According to one aspect of the present disclosure, there is provided an authentication system including: input information acquisition means configured to acquire input information, which accompanies a card possessed by a user, and has been input from a user terminal through use of reading means or photographing means; identification information acquisition means configured to acquire identification information that enables identification of the card; registered information acquisition means configured to acquire registered information, which accompanies the card, and has been registered in a server in association with the identification information in advance; and authentication means configured to execute authentication based on the input information and the registered information.

Advantageous Effects of Invention

According to the present disclosure, the security in the possession authentication is enhanced.

BRIEF DESCRIPTION OF DRAWINGS

FIG. 7 is a table for showing a data storage example of a user database.
FIG. 8 is a table for showing a data storage example of a card database.

DESCRIPTION OF EMBODIMENTS

1. First Embodiment

Now, an example of an authentication system according to a first embodiment of the present disclosure is described. In the authentication system, possession authentication is executed. The possession authentication is authentication utilizing an object possessed only by a valid person. The object to be utilized for the possession authentication is not limited to a tangible object, and may be an intangible object, for example, electronic data. In the first embodiment, possession authentication utilizing a transportation-related IC card (hereinafter referred to simply as "card") is taken as an example. The possession authentication may hereinafter be referred to simply as "authentication."

1-1. Overall Configuration of Authentication System

Figure 1:
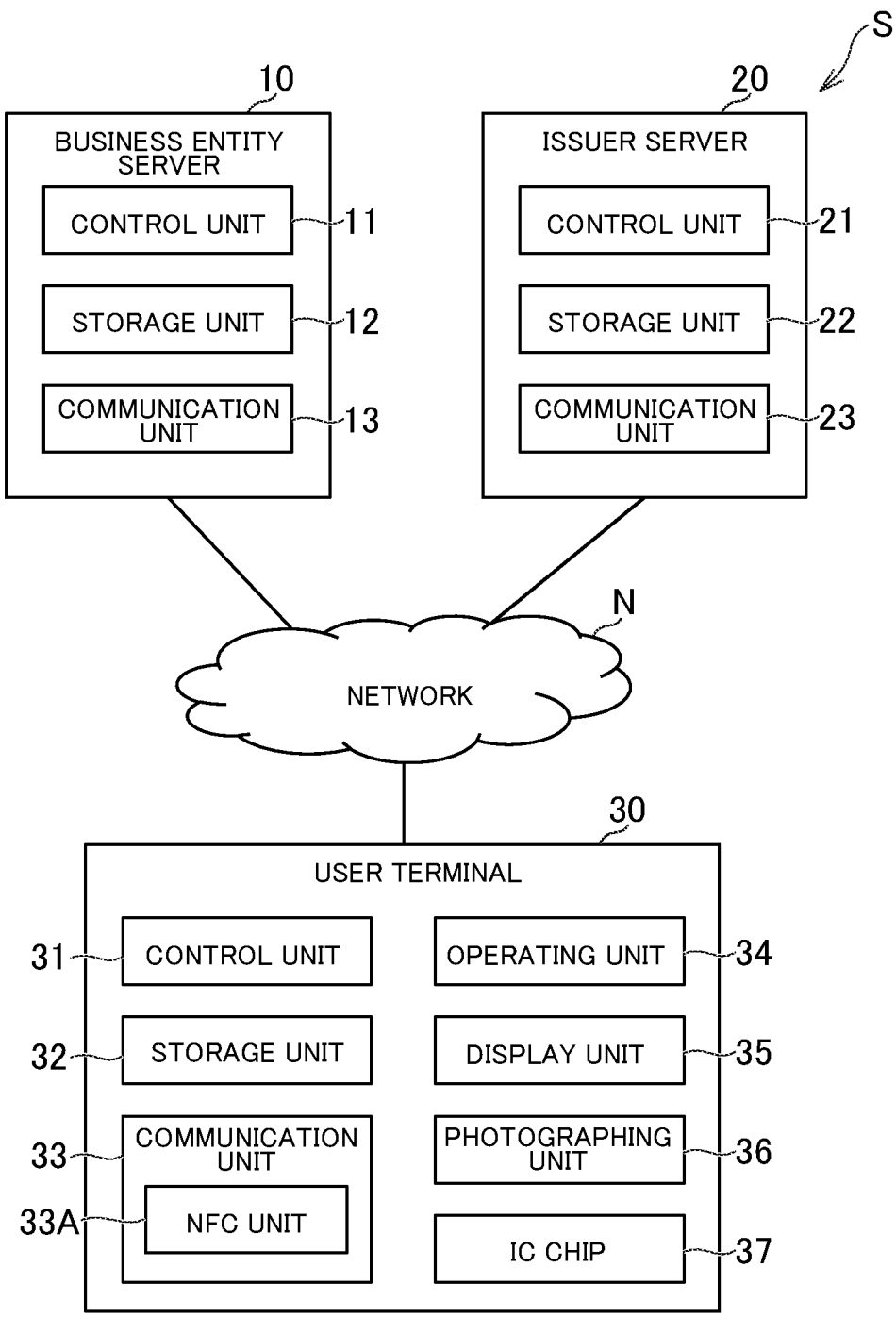
FIG. 1 is a diagram for illustrating an example of an overall configuration of an authentication system.

FIG. 1 is a diagram for illustrating an example of an overall configuration of the authentication system. As illustrated in FIG. 1, an authentication system S includes a business entity server 10, an issuer server 20, and a user terminal 30. Each of the business entity server 10, the issuer server 20, and the user terminal 30 can be connected to a network N, for example, the Internet. In FIG. 1, one business entity server 10, one issuer server 20, and one user terminal 30 are illustrated, but there may be a plurality of business entity servers 10, a plurality of issuer servers 20, and a plurality of user terminals 30.

The business entity server 10 is a server computer corresponding to a business entity that provides a service using a card. The business entity is an entity that provides a service to a user. In the first embodiment, a transportation-related service using a card is taken as an example, and hence the business entity is, for example, a railroad company or a bus company.

The business entity server 10 includes a control unit 11, a storage unit 12, and a communication unit 13. The control unit 11 includes at least one processor. The storage unit 12 includes a volatile memory, for example, a RAM, and a nonvolatile memory, for example, a hard disk drive. The communication unit 13 includes at least one of a communication interface for wired communication or a communication interface for wireless communication.

The issuer server 20 is a server computer corresponding to an issuer that has issued a card. The issuer is an entity that provides a card to a user. In the first embodiment, a case in which the issuer and the business entity are the same is described, but the issuer and the business entity may be different from each other. The issuer server 20 includes a control unit 21, a storage unit 22, and a communication unit 23. Physical configurations of the control unit 21, the storage unit 22, and the communication unit 23 may be the same as those of the control unit 11, the storage unit 12, and the communication unit 13, respectively.

The user terminal 30 is a computer to be operated by a user. For example, the user terminal 30 is a smartphone, a tablet computer, a wearable terminal, or a personal computer. The user terminal 30 includes a control unit 31, a storage unit 32, a communication unit 33, an operating unit 34, a display unit 35, a photographing unit 36, and an IC chip 37. Physical configurations of the control unit 31 and the storage unit 32 are the same as those of the control unit 11 and the storage unit 12, respectively.

The communication unit 33 includes at least one of a communication interface for wired communication or a communication interface for wireless communication. Those communication interfaces are used for connection to the network N. The communication unit 33 in the first embodiment further includes an NFC unit 33A. The NFC unit 33A includes a communication interface for near field communication (NFC).

For NFC itself, various standards can be used, and international standards, for example, ISO/IEC 18092 or ISO/IEC 21481 can be used. The NFC unit 33A includes hardware including an antenna conforming to the standards, and implements, for example, a reader/writer function, a peer-to-peer function, a card emulation function, a wireless charging function, or a combination thereof.

The operating unit 34 is an input device, for example, a touch panel. The display unit 35 is a liquid crystal display or an organic EL display. The photographing unit 36 includes at least one camera. The IC chip 37 is a chip that supports NFC. The IC chip 37 may be a chip of any standards, for example, a chip of FeliCa (trademark) or a chip of a so-called Type A or Type B among the non-contact type standards. The IC chip 37 includes hardware including an antenna conforming to the standards, and stores, for example, information required for a service to be used by a user.

At least one of programs or data stored in the storage units 12, 22, and 32 may be supplied thereto via the network N. Further, each of the business entity server 10, the issuer server 20, and the user terminal 30 may include at least one of a reading unit (e.g., an optical disc drive or a memory card slot) for reading a computer-readable information storage medium, or an input/output unit (e.g., a USB port) for inputting and outputting data to/from an external device. For example, at least one of the program or the data stored in the information storage medium may be supplied through intermediation of at least one of the reading unit or the input/output unit.

1-2. Outline of First Embodiment

In the first embodiment, processing of the authentication system S is described by taking as an exemplary case in which a user registers a card in a transportation-related application (hereinafter referred to simply as "app"). The app in the first embodiment is a program for using a transportation-related service through use of the user terminal 30. The app has been downloaded and installed in the user terminal 30 in advance.

The registering of a card in the app means enabling a service equivalent to a service available through use of the card to be used from the app. For example, enabling use of card information from the app, associating the card information with the app, or associating the card information with a user account corresponds to the registering of the card in the app. In addition, for example, recording the card information in the business entity server 10 or the IC chip 37 corresponds to the registering of the card in the app.

The card information is information that can identify the card. The card information includes at least a card number. The card number is a number that uniquely identifies the card. The card information may include supplementary information that accompanies the card. The supplementary information is information other than the card number, for example, an expiration date of the card, a full name of the user, an issue date of the card, or an ID that can identify an IC chip included in the card. When a plurality of services can be used through use of the card, an ID used for each service also corresponds to the supplementary information.

For example, the user finishes registering use of the app to have a user account and other information issued. After that, in order to register the card in the app, the user performs an operation for registering the card from, for example, a menu of the app. When this operation is performed, an input screen for inputting the card information of the card to be registered in the app is displayed on the display unit 35.

Figure 2:
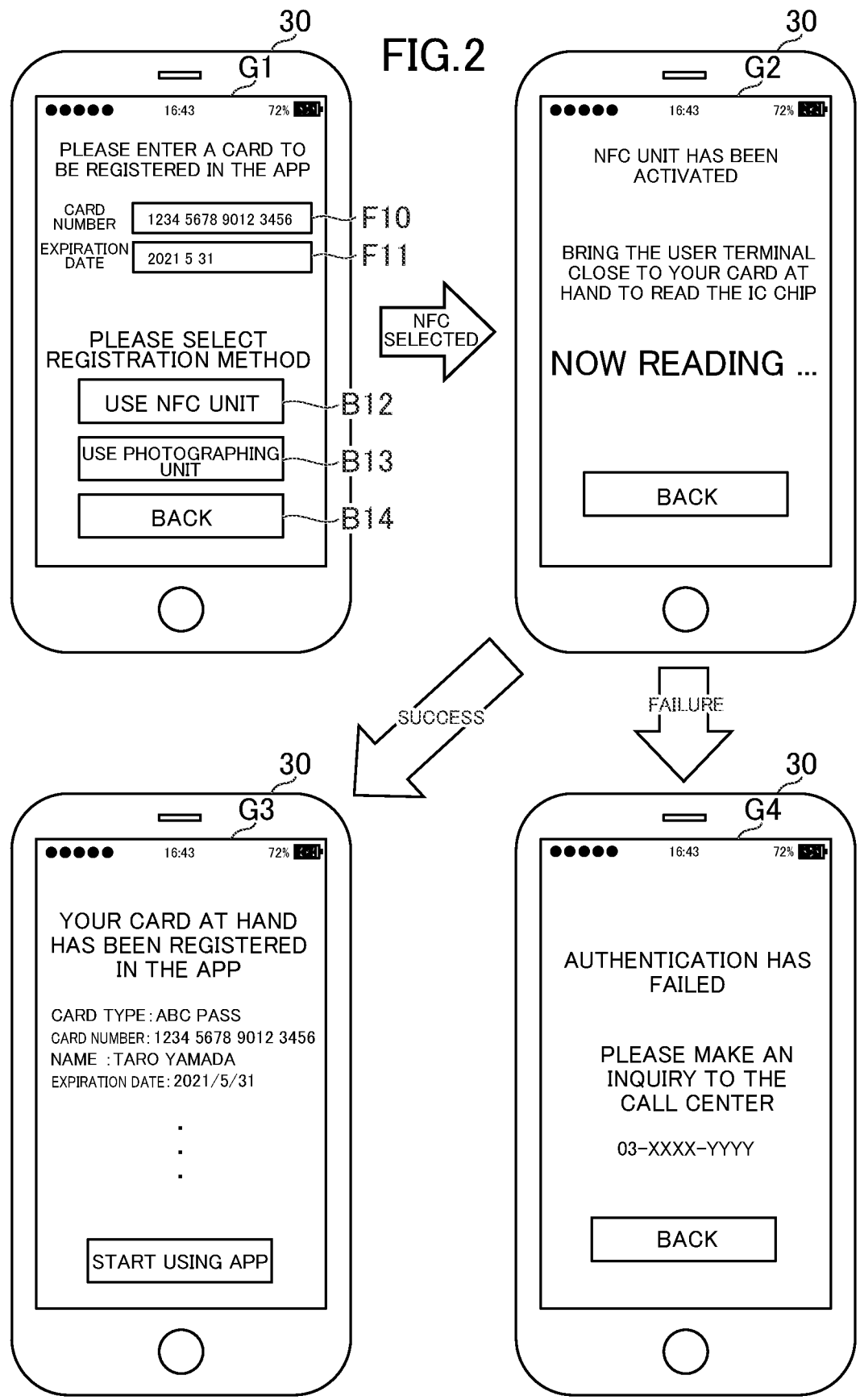
FIG. 2 is a view for illustrating an example of a flow of registering a card in an app.

FIG. 2 is a view for illustrating an example of a flow of registering the card in the app. As illustrated in FIG. 2, on an input screen G1, an input form F10 for inputting the card number and an input form F11 for inputting the expiration date are displayed. The user examines the card number and the expiration date of the card to be registered in the app, and inputs the card number and the expiration date to the input forms F10 and F11, respectively.

In the first embodiment, as the authentication at a time of card registration, there are two types of authentication, that is, NFC authentication utilizing NFC and image authentication utilizing an image. The NFC authentication is authentication to be executed by causing the NFC unit 33A to read information recorded on the IC chip of the card. The image authentication is authentication to be executed by causing the photographing unit 36 to photograph the card. The NFC authentication and the image authentication are hereinafter referred to simply as "authentication" unless distinguished therebetween.

The flow of FIG. 2 is a flow of the NFC authentication. When the user selects a button B12 on the input screen G1, the NFC unit 33A is activated, and a reading screen G2 for causing the NFC unit 33A to read the information recorded on the IC chip of the card is displayed on the display unit 35. The reading screen G2 may be displayed as a part of a procedure for registering the use of the app. When the reading screen G2 is displayed, the user brings the user terminal 30 close to the card.

Figure 3:
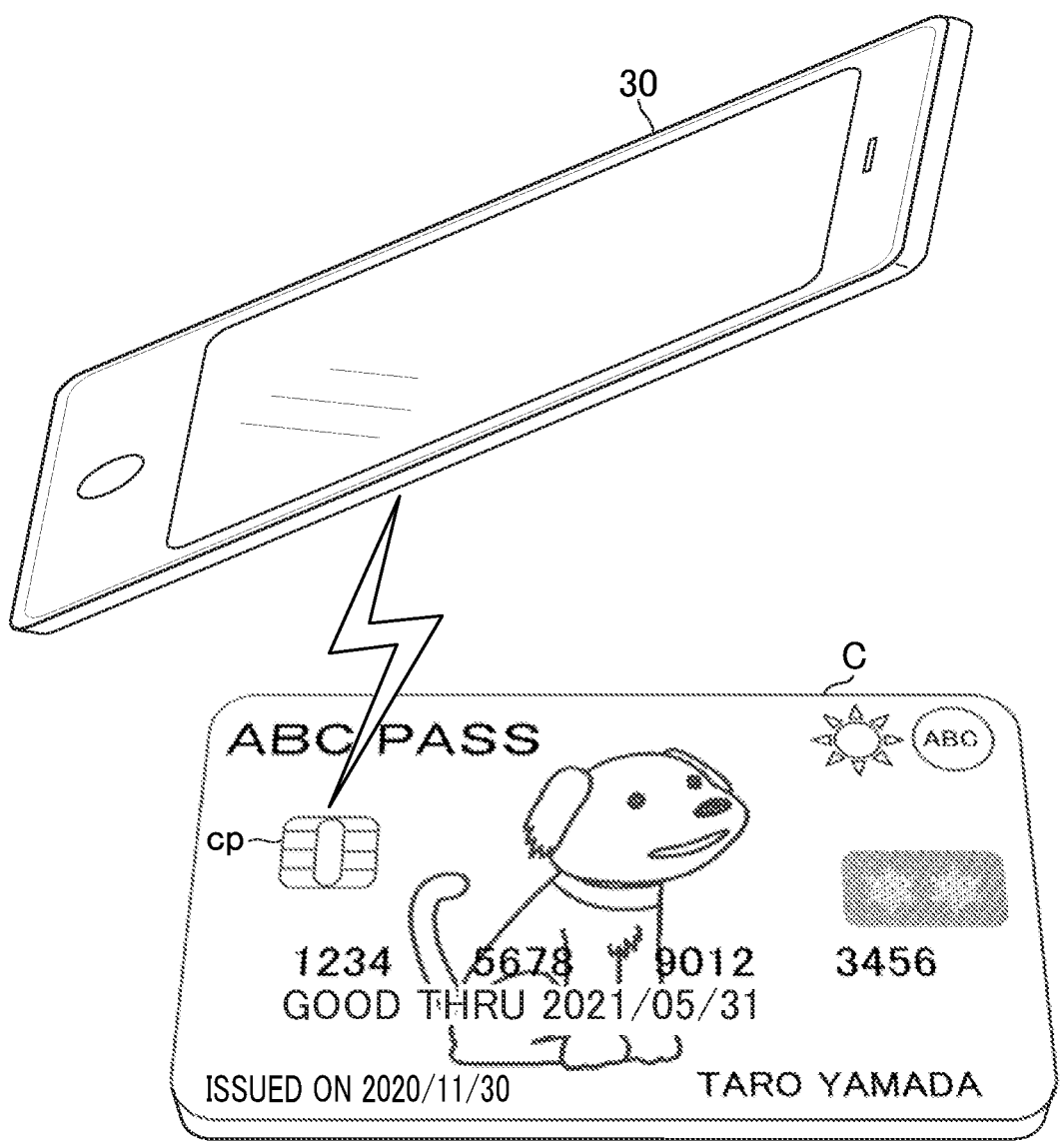
FIG. 3 is a view for illustrating an example of how an IC chip of the card is read by an NFC unit.

FIG. 3 is a view for illustrating an example of how the IC chip of the card is read by the NFC unit 33A. As illustrated in FIG. 3, when the user brings the user terminal 30 close to an IC chip cp of a card C, the NFC unit 33A reads the information recorded on the IC chip cp. The NFC unit 33A can read any information in the IC chip cp, but in the first embodiment, a case in which the NFC unit 33A reads an ID number recorded on the IC chip cp is described.

The ID number is information for using a predetermined service through use of the card C. The service to be used through use of the ID number may be the same as the service to be used through use of the card number, but in the first embodiment, a case in which the service to be used through use of the ID number is different from the service to be used through use of the card number is described. Accordingly, the ID number is a number for using a service different from the transportation-related service.

In the first embodiment, a fitness service is taken as an example of the service to be used through use of the ID number. The user is a member of a fitness club, and holds the card C over a reader terminal installed in the fitness club to perform an admission procedure. At that time, the ID number recorded on the IC chip cp of the card C is transmitted to the reader terminal, and authentication at a time of admission is executed by a computer in the fitness club. Accordingly, the ID number corresponds to a membership number of the fitness club.

With one card, the user can use two services, that is, the transportation-related service and the fitness service. The number of services that can be used with one card may be three or more. In this case, it is assumed that some information on each service is recorded on the IC chip cp of the card C.

When the user terminal 30 reads the ID number by the NFC unit 33A, the user terminal 30 transmits the ID number to the business entity server 10. The ID number is transmitted from the user terminal 30 to the business entity server 10, and is hence hereafter referred to as "input ID number." The "input" in the first embodiment means transmitting data.

In the first embodiment, the ID number included in the issued card C is registered in the issuer server 20. This ID number is hereinafter referred to as "registered ID number." When the user is a valid owner of the card C, the same registered ID number as the input ID number is registered in the issuer server 20. In the following description, when the input ID number and the registered ID number may be referred to as simply as "ID number" unless particularly distinguished therebetween.

When the business entity server 10 receives the input ID number from the user terminal 30, the business entity server 10 transfers the input ID number to the issuer server 20. The issuer server 20 determines whether or not the transferred input ID number and the registered ID number match. The issuer server 20 transmits a determination result to the business entity server 10.

When the business entity server 10 receives the determination result indicating that the ID numbers match, the business entity server 10 determines that the user is a valid owner, and the authentication is successful. In this case, as illustrated in FIG. 2, a success screen G3 indicating that the authentication is successful and the registration has been completed is displayed on the user terminal 30. From then on, the user can use, from the app, the same service as that available when the physical card C is used.

When the business entity server 10 receives the determination result indicating that the ID numbers do not match, the business entity server 10 determines that the user is not a valid owner, and the authentication fails. In this case, as illustrated in FIG. 2, a failure screen G4 indicating that the authentication fails and the registration has not been completed is displayed on the user terminal 30. The user returns to the reading screen G2 to read the card C again, and performs an inquiry to a call center.

Figure 4:
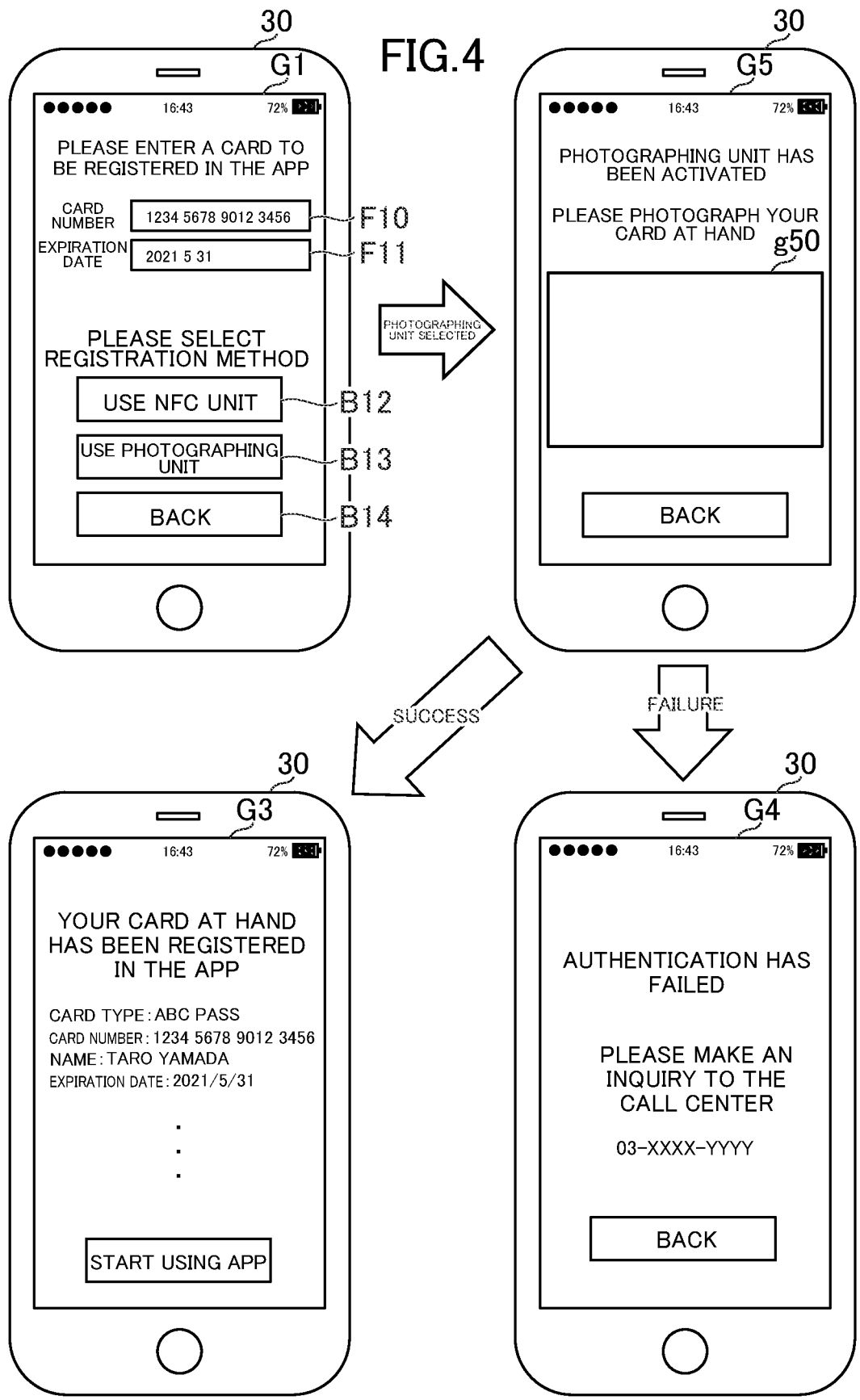
FIG. 4 is a view for illustrating an example of a flow of image authentication.

Next, a flow of the image authentication is described. FIG. 4 is a view for illustrating an example of the flow of the image authentication. As illustrated in FIG. 4, when the user selects a button B13 on the input screen G1, the photographing unit 36 is activated, and a photographing screen G5 for causing the photographing unit 36 to photograph the card C is displayed on the display unit 35. The photographing screen G5 may be displayed as a part of a procedure for registering the use of the app.

On the photographing screen G5, photographed images continuously acquired by the photographing unit 36 are displayed. A guide g50 for showing a guide to a positional relationship between the photographing unit 36 and the card is displayed over the photographed image. In the first embodiment, it is demanded that the card C be photographed from the front in a predetermined size. For example, the user places the card C on a desk, and photographs the card C so that edges of the card C fit the guide g50. The user may photograph the card C with the user terminal 30 turned sideways.

Figure 5:
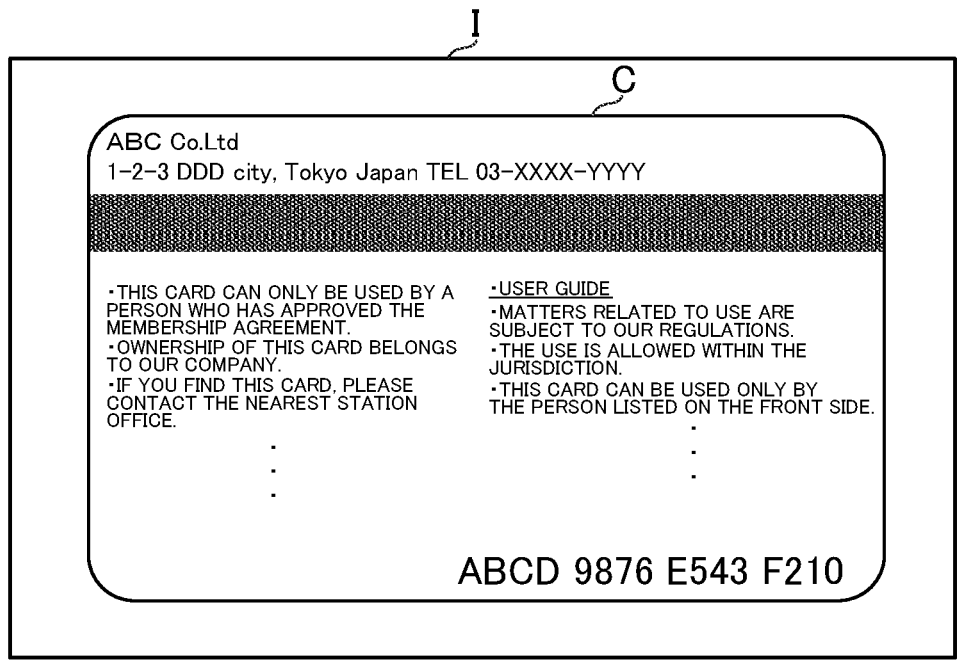
FIG. 5 is a view for illustrating an example of a photographed image in which the card has been captured.

FIG. 5 is a view for illustrating an example of a photographed image in which the card C has been captured. As illustrated in FIG. 5, in the first embodiment, a case in which the user photographs the back side of the card C is described. Various kinds of information included in the back side of the card C are captured in a photographed image I. The above-mentioned information includes an ID number in the lower right of the back side of the card C. The user terminal 30 executes optical character recognition on the photographed image I to acquire the ID number. The flow after the business entity server 10 has received the ID number is the same as that of the NFC authentication. The optical character recognition may be executed by the business entity server 10 or the issuer server 20.

As described above, in the authentication system S, the authentication is executed based on the input ID number acquired through use of the NFC unit 33A or the photographing unit 36 and the registered ID number registered in the issuer server 20. Even when a malicious third party attempts to register the illegally obtained card information in the app, the malicious third party cannot acquire the input ID number through use of the NFC unit 33A or the photographing unit 36, and cannot obtain the information on a different service in the first place, to thereby fail to succeed in the authentication. In the first embodiment, the security in possession authentication is enhanced by utilizing such a peculiarity that the input ID number of a different service is acquired by the NFC unit 33A or the photographing unit 36. Now, details of this technology are described.

1-3. Functions Implemented in First Embodiment

Figure 6:
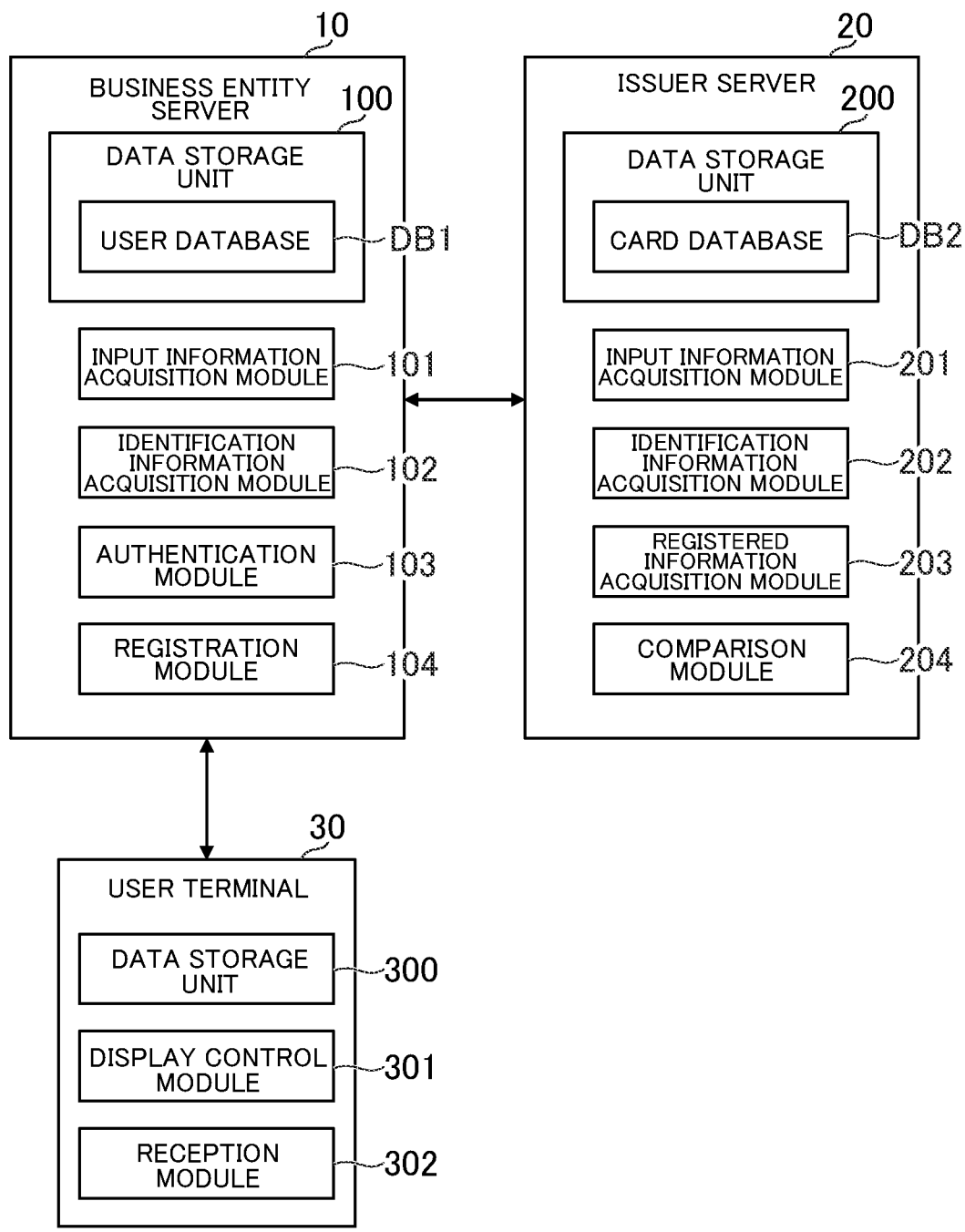
FIG. 6 is a functional block diagram for illustrating an example of functions implemented by an authentication system according to a first embodiment of the present disclosure.

FIG. 6 is a functional block diagram for illustrating an example of functions implemented by the authentication system S according to the first embodiment. In this case, the functions implemented by each of the business entity server 10, the issuer server 20, and the user terminal 30 are described.

[1-3-1. Functions Implemented on Business Entity Server]

As illustrated in FIG. 6, on the business entity server 10, a data storage unit 100, an input information acquisition module 101, an identification information acquisition module 102, an authentication module 103, and a registration module 104 are implemented. The data storage unit 100 is implemented mainly by the storage unit 12. Each of the other functions is mainly implemented by the control unit 11.

[Data Storage Unit]

The data storage unit 100 stores the data required for authentication. For example, a user database DB1 is described for the data storage unit 100.

FIG. 7 is a table for showing a data storage example of the user database DB1. As shown in FIG. 7, the user database DB1 is a database in which information relating to users is stored. For example, the user database DB1 stores a user account, a password, a full name, and card information. When a user has registered the use of a service, a user account is issued, and a new record is created in the user database DB1. This record stores a password and a full name that have been designated at a time of registration.

In the first embodiment, a case in which the card information is registered after registration of the use of the service has been completed is described, but the card information may be registered at a time of the registration of the use of the service. The card information stored in the user database DB1 is card information of the card C registered in the app. The number of cards C that can be registered in the app is not limited to one, and a plurality of cards may be registered in the app.

The card information stored in the user database DB1 is only required to include minimum information for providing the service. That is, not all pieces of supplementary information of the card C are required to be stored in the user database DB1. The card information stored in the user database DB1 may be only the card number, or may include information (for example, a security code or a password in so-called 3-D Secure) other than the information shown in FIG. 7. The details of the card information are shown as they are in FIG. 7, but the card information may be hashed.

[Input Information Acquisition Module]

The input information acquisition module 101 acquires the input ID number input from the user terminal 30 through use of the NFC unit 33A or the photographing unit 36. The NFC unit 33A is an example of a reading unit. The reading unit is a reader for reading information recorded on an external information storage medium. The reading unit may be a reader for reading the information optically or magnetically instead of reading the information through use of wireless communication as in the first embodiment. To use the wireless communication, it is possible to use other standards, for example, RFID, instead of NFC. It suffices that the reading unit has at least a reader function, and the reading unit is not required to have a writer function.

In the first embodiment, the business entity server 10 directly communicates to/from the user terminal 30, and hence the input information acquisition module 101 directly acquires the input ID number from the user terminal 30. When there is a computer for mediating communication between the business entity server 10 and the user terminal 30, the input information acquisition module 101 may acquire the input ID number transferred by this computer. That is, the input information acquisition module 101 may indirectly acquire the input ID number from the user terminal 30.

The input ID number is an example of input information. Accordingly, the input ID number as used in the first embodiment can be read as "input information." The input information is information input at a time of authentication. The input information corresponds to a query at the time of the authentication. The input information is not limited to an input ID number, and may have any format. For example, the input information may be characters, numerals, or a combination thereof. In addition, for example, the photographed image may correspond to the input information.

The input information is supplementary information that accompanies the card C possessed by the user. In addition to the above-mentioned example, the supplementary information may be any information that is associated with the card number. It suffices that the supplementary information is information that can be detected by the NFC unit 33A or the photographing unit 36. The information recorded on the IC chip of the card C or the information formed on the surface of the card C is the supplementary information. The formation is not limited to printing an image of, for example, characters, and also means that the formation includes an embossing process for providing an uneven shape.

In the first embodiment, the input information acquisition module 101 acquires, as the input information, the input ID number for the user to use a first service through use of the card C. The first service is a service different from a second service. In the first embodiment, the fitness service corresponds to the first service. The input ID number is used as authentication information for the first service.

[Identification Information Acquisition Module]

The identification information acquisition module 102 acquires the card number of the card C to be registered. The card number is an example of identification information. Accordingly, the card number as used in the first embodiment can be read as "identification information." The identification information is information that can identify the card C. The identification information may be any information that uniquely identifies the card C, and is not limited to the card number. A combination of a plurality of pieces of information, for example, the card number, the expiration date, and the full name, may correspond to the identification information. As another example of the identification information, an ID number corresponding to the card C on a one-to-one basis may correspond to the identification information. This ID number only identifies the card C, and is different from the input ID number.

In the first embodiment, the user inputs the card number to the input form F10, and hence the identification information acquisition module 102 acquires the card number input by the user. It suffices that the card number is acquired by a method defined in advance, and the user is not required to manually input the card number. For example, the identification information acquisition module 102 may acquire the card number by executing the optical character recognition on the photographed image obtained by photographing the front side of the card C. In addition, for example, when the card number is recorded on the user terminal 30, the identification information acquisition module 102 may acquire the card number stored in the user terminal 30.

The identification information acquisition module 102 acquires, as the identification information, the card number for the user to use the second service different from the first service through use of the card C. In the first embodiment, the transportation-related service corresponds to the second service. The second service may be any service that is different from the first service, and is not limited to the example of the first embodiment. The card number is used as authentication information for the second service.

[Authentication Module]

The authentication module 103 executes the authentication based on the input ID number and the registered ID number. In the first embodiment, the authentication module 103 executes the authentication based on a result of comparison between the input ID number and the registered ID number. This comparison result is a result of determination of whether or not the ID numbers match. The determination result indicates any one of a first value meaning that the ID numbers match or a second value meaning that the ID numbers do not match. In the first embodiment, a perfect match is required, but the authentication may be successful when a partial match is achieved.

In the first embodiment, the comparison between the input ID number and the registered ID number is executed by a comparison module 204 of the issuer server 20 instead of the authentication module 103 of the business entity server 10. The authentication module 103 acquires a comparison result obtained by the comparison module 204 from the issuer server 20, and executes the authentication. When the input ID number and the registered ID number match, the authentication is successful. When the input ID number and the registered ID number do not match, the authentication fails.

[Registration Module]

The registration module 104 executes registration processing relating to the card C corresponding to the card number based on an execution result of the authentication performed by the authentication module 103. The registration processing is processing for enabling the use of the card C to be registered. In the first embodiment, registering the card C in the app corresponds to the registration processing. In particular, when the app is not used, the registration processing may mean recording the card information on some computer, for example, the business entity server 10.

The card C to be registered is the card C to be registered by the registration processing. The card C to be registered is identified by the card number. In the first embodiment, the card C including the input ID number corresponds to the card C to be registered. In the first embodiment, a case in which the card number of the card C to be registered is input by the user is described, but as described in the processing of the identification information acquisition module 102, this card number can be acquired by any method.

The registration module 104 executes the registration processing when the authentication is successful, and does not execute the registration processing when the authentication fails. That is, the success or failure of the authentication is a condition for whether or not to execute the registration processing. When the authentication of a certain user is successful, the registration module 104 executes the registration processing by storing the card information of the card C to be registered into a record of the user database DB1 that corresponds to the user account of the certain user. The user account is input at a time of login. The card information of the card C to be registered is acquired from the issuer server 20.

[1-3-2. Functions Implemented on Issuer Server]

As illustrated in FIG. 6, on the issuer server 20, a data storage unit 200, an input information acquisition module 201, an identification information acquisition module 202, a registered information acquisition module 203, and the comparison module 204 are implemented. The data storage unit 200 is implemented mainly by the storage unit 22. Each of the other functions is mainly implemented by the control unit 21.

[Data Storage Unit]

The data storage unit 200 stores the data required for authentication. For example, a card database DB2 is described for the data storage unit 200.

FIG. 8 is a table for showing a data storage example of the card database DB2. As shown in FIG. 6, the card database DB2 is a database in which card information of the issued card C is stored. For example, the card database DB2 stores a card number, an expiration date, a full name, and a registered ID number. When a new card C is issued, a new record is created in the card database DB2, and the card information of the new card C is stored.

The card information stored in the card database DB2 may be only the card number, or may include information (for example, a security code or a password in so-called 3-D Secure) other than the information shown in FIG. 8. When the card C is registered in the app, all or part of the card information of the card C stored in the card database DB2 is stored into the user database DB1. The registered ID number is registered by the issuer when the card C is issued.

[Input Information Acquisition Module]

The input information acquisition module 201 acquires the input ID number input from the user terminal 30. In the first embodiment, the input information acquisition module 201 acquires the input ID number transferred from the business entity server 10. That is, the input information acquisition module 201 indirectly acquires the input ID number input from the user terminal 30. The input ID number may be directly input from the user terminal 30 to the issuer server 20. In this case, the input information acquisition module 201 directly acquires the input ID number input from the user terminal 30.

[Identification Information Acquisition Module]

The identification information acquisition module 202 acquires the card number of the card C to be registered. In the first embodiment, the identification information acquisition module 202 acquires the ID number transferred from the business entity server 10. That is, the identification information acquisition module 202 indirectly acquires the ID number input from the user terminal 30. The ID number may be directly input from the user terminal 30 to the issuer server 20. In this case, the identification information acquisition module 202 directly acquires the ID number input from the user terminal 30.

[Registered Information Acquisition Module]

The registered information acquisition module 203 acquires the registered ID number registered in association with the card number acquired by the identification information acquisition module 202. In the first embodiment, the registered ID number is stored in the card database DB2, and hence the registered information acquisition module 203 acquires the registered ID number from the card database DB2. The registered information acquisition module 203 acquires the registered ID number stored in the same record as that storing the card number acquired by the identification information acquisition module 202. When the registered ID number is stored in an external computer or an external information storage medium, the registered information acquisition module 203 may acquire the registered ID number from the external computer or the external information storage medium.

The registered ID number is an example of the registered information. The registered ID number as used in the first embodiment can be read as "registered information." The registered information is information which accompanies the card C, and has been registered in the issuer server 20 in advance in association with the card number. The registered information is information to be used as a correct answer at the time of the authentication. The registered information is information corresponding to an index at the time of authentication. The registered information is not limited to an ID format, and may have any format. For example, the registered information may be an image, or may be characters, numerals, or a combination thereof. The registered information may be information that can be compared to the input information. The registered information may have the same format as that of the input information, or may have a format different therefrom.

For example, the registered information acquisition module 203 acquires, as the registered information, the registered ID number for the user to use the first service through use of the card C. In the first embodiment, the fitness service corresponds to the first service. The registered ID number is the same as the input ID number when the user is valid, and is thus used as the authentication information for the first service.

[Comparison Module]

The comparison module 204 compares the input ID number and the registered ID number to each other. The comparison module 204 determines whether or not those ID numbers match. As described above, in the first embodiment, a perfect match is required, but the match may be determined when a partial match is achieved. The comparison module 204 transmits a result of comparison between the input ID number and the registered ID number to the business entity server 10.

[1-3-3. Functions Implemented on User Terminal]

As illustrated in FIG. 6, on the user terminal 30, a data storage unit 300, a display control module 301, and a reception module 302 are implemented. The data storage unit 300 is implemented mainly by the storage unit 32. Each of the display control module 301 and the reception module 302 is implemented mainly by the control unit 31. The data storage unit 300 stores data required for processing described in the first embodiment. For example, the data storage unit 300 stores a transportation-related app. The display control module 301 causes the display unit 35 to display each of the screens described with reference to FIG. 2 and FIG. 4 based on the app. The reception module 302 receives the user's operation on each screen.

1-4. Processing to be Executed in First Embodiment

Figure 9:
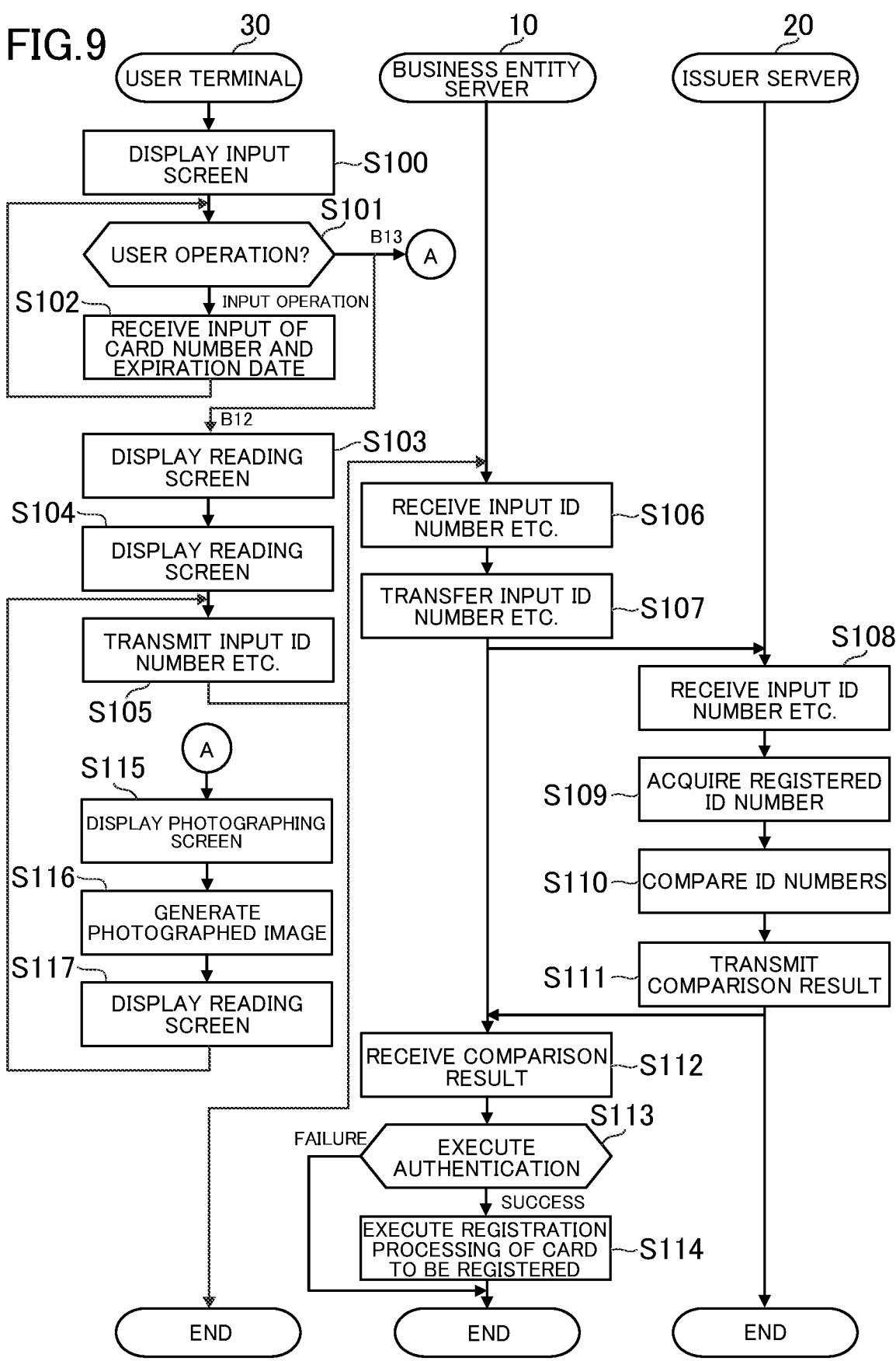
FIG. 9 is a flow chart for illustrating an example of processing to be executed in the first embodiment.

FIG. 9 is a flow chart for illustrating an example of processing to be executed in the first embodiment. The processing illustrated in FIG. 9 is executed by the control units 11, 21, and 31 operating in accordance with the programs stored in the storage units 12, 22, and 32, respectively. This processing is an example of processing to be executed by the functional blocks illustrated in FIG. 6. This processing is executed when the app of the user terminal 30 is activated and an operation for registering the card C is performed from a predetermined menu.

As illustrated in FIG. 9, the user terminal 30 causes the display unit 35 to display the input screen G1 for inputting a card number and an expiration date (Step S100). The user terminal 30 identifies an operation of the user based on a detection signal obtained by the operating unit 34 (Step S101). In Step S101, an input operation with respect to the input forms F10 and F11 and a selection operation for each of the buttons B12 and B13 are performed. When a button B14 is selected, this process ends.

When an input operation is performed on the input forms F10 and F11 ("input operation" in Step S101), the user terminal 30 receives the input of the card number and the expiration date of the card C to be registered (Step S102), and the process returns to Step S101. In Step S102, the card number and the expiration date that have been input by the user are displayed on the input forms F10 and F11.

When the selection operation of the button B12 is performed ("B12" in Step S101), the user terminal 30 activates the NFC unit 33A to display the reading screen G2 on the display unit 35 (Step S103). The user terminal 30 uses the NFC unit 33A to acquire the input ID number from the IC chip cp of the card C (Step S104), and transmits, to the business entity server 10, the card number and the expiration date that have been input to the input forms F10 and F11, respectively, and the input ID number obtained from the card C (Step S105). The user has already logged in to the app, and the user account of the user is also transmitted to the business entity server 10.

When the business entity server 10 receives the card number, the expiration date, and the input ID number from the user terminal 30 (Step S106), the business entity server 10 transfers the card number, the expiration date, and the input ID number to the issuer server 20 (Step S107). When the issuer server 20 receives the card number, the expiration date, and the input ID number from the business entity server 10 (Step S108), the issuer server 20 refers to the card database DB2 to acquire the registered ID number associated with the card number and the expiration date that have been received (Step S109). In Step S108, when a record matching a pair of the card number and the expiration date is not present in the card database DB2, an error occurs, and this process ends. In this case, at least one of the card number or the expiration date is incomplete, and hence the registration processing is not executed.

The issuer server 20 compares the input ID number received in Step S108 and the registered ID number acquired in Step S109 to each other (Step S110), and transmits the comparison result to the business entity server 10 (Step S111). In Step S110, the issuer server 20 determines whether or not the input ID number and the registered ID number match. In Step S111, the issuer server 20 transmits, as the comparison result, the determination result obtained in Step S110. It is assumed that this comparison result includes the card number received in Step S108.

When the business entity server 10 receives the comparison result from the issuer server 20 (Step S112), the business entity server 10 refers to the comparison result to execute the authentication (Step S113). When the comparison result indicates the match and the authentication is successful ("success" in Step S113), the business entity server 10 executes the registration processing of the card C to be registered (Step S114), and this process ends. In Step S114, the business entity server 10 registers the card information of the card to be registered in the user database DB1 in association with the user account of the user. The business entity server 10 transmits the display data of the success screen G3 to the user terminal 30, and the success screen G3 is displayed.

Meanwhile, when the authentication fails due to the comparison result not indicating the match ("failure" in Step S113), the processing step of Step S114 is not executed, and this process ends. In this case, the card information of the card C to be registered is not registered in the user database DB1. The business entity server 10 transmits the display data of the failure screen G4 to the user terminal 30, and the failure screen G4 is displayed.

When the selection operation of the button B13 is performed in Step S101 ("B13" in Step S101), the user terminal 30 activates the photographing unit 36 to display the images continuously photographed by the photographing unit 36 on the photographing screen G5 (Step S115). When the user, for example, taps on the photographing screen G5, the user terminal 30 causes the photographing unit 36 to photograph the card C, and generates a photographed image (Step S116). The user terminal 30 executes the optical character recognition on the photographed image to acquire the input ID number (Step S117), and the process advances to Step S105. When the input ID number is not acquired, an error occurs, and this process is ended. The optical character recognition may be executed by the business entity server 10 or the issuer server 20.

According to the authentication system S of the first embodiment, the authentication is executed based on the input ID number acquired through use of the NFC unit 33A or the photographing unit 36 and the registered ID number associated with the card number of the card C to be registered, to thereby enhance the security in possession authentication utilizing the card C. In addition, when the photographing unit 36 is used, a malicious third party dislikes his or her face included in the photograph for some reason, and hence requesting the card C to be photographed can pose a psychological barrier. In another regard, card information including a card number may be registered in various servers, and can be said to be information relatively accessible to a malicious third party. Meanwhile, an ID number is registered in a small number of servers, and hence cannot be obtained by a third party in principle. Accordingly, even when a third party illegally obtains the card information, the ID number cannot be identified in principle unless the card C itself is stolen. In view of this, the authentication is executed by utilizing the ID number, to thereby be able to prevent unauthorized registration from being performed by a third party who has illegally obtained the card information. For example, authentication involving input of a security code of the card C is also generally called possession authentication, but the possession authentication in the first embodiment cannot be successful only based on knowledge of the security code or other such information, and hence it is possible to achieve robust possession authentication in terms of security.

Further, the authentication system S utilizes the input ID number and the registered ID number for use of the fitness service different from the transportation-related service, to thereby be able to execute the authentication based on the information that is more difficult for a third party to obtain, resulting in enhanced security.

Further, in the authentication system S, the issuer server 20 compares the input ID number and the registered ID number, and the business entity server 10 acquires the comparison result from the issuer server 20 to execute the authentication, to thereby eliminate requirement for management of the registered ID number on the business entity server 10 and prevent the registered ID number from being transmitted on the network N. Accordingly, the registered ID number being confidential information is less liable to be leaked, to thereby be able to effectively enhance the security. In addition, the processing required for the authentication is shared between the business entity server 10 and the issuer server 20, to thereby be able to distribute processing loads at the time of the authentication.

Further, in the authentication system S, the registration processing relating to the card C corresponding to the card number is executed based on the execution result of the authentication, to thereby enhance the security at the time of the registration of the card. That is, it is possible to prevent unauthorized registration from being performed by a third party who has illegally obtained the card information.

2. Second Embodiment

Next, an authentication system S according to a second embodiment of the present disclosure is described. In the second embodiment, a case in which the comparison between the input ID number and the registered ID number is executed not by the issuer server 20 but by the business entity server 10 is described. In the same manner as in the first embodiment, the registered ID number is registered in the issuer server 20. The same points as those of the first embodiment are omitted from the following description.

Figure 10:
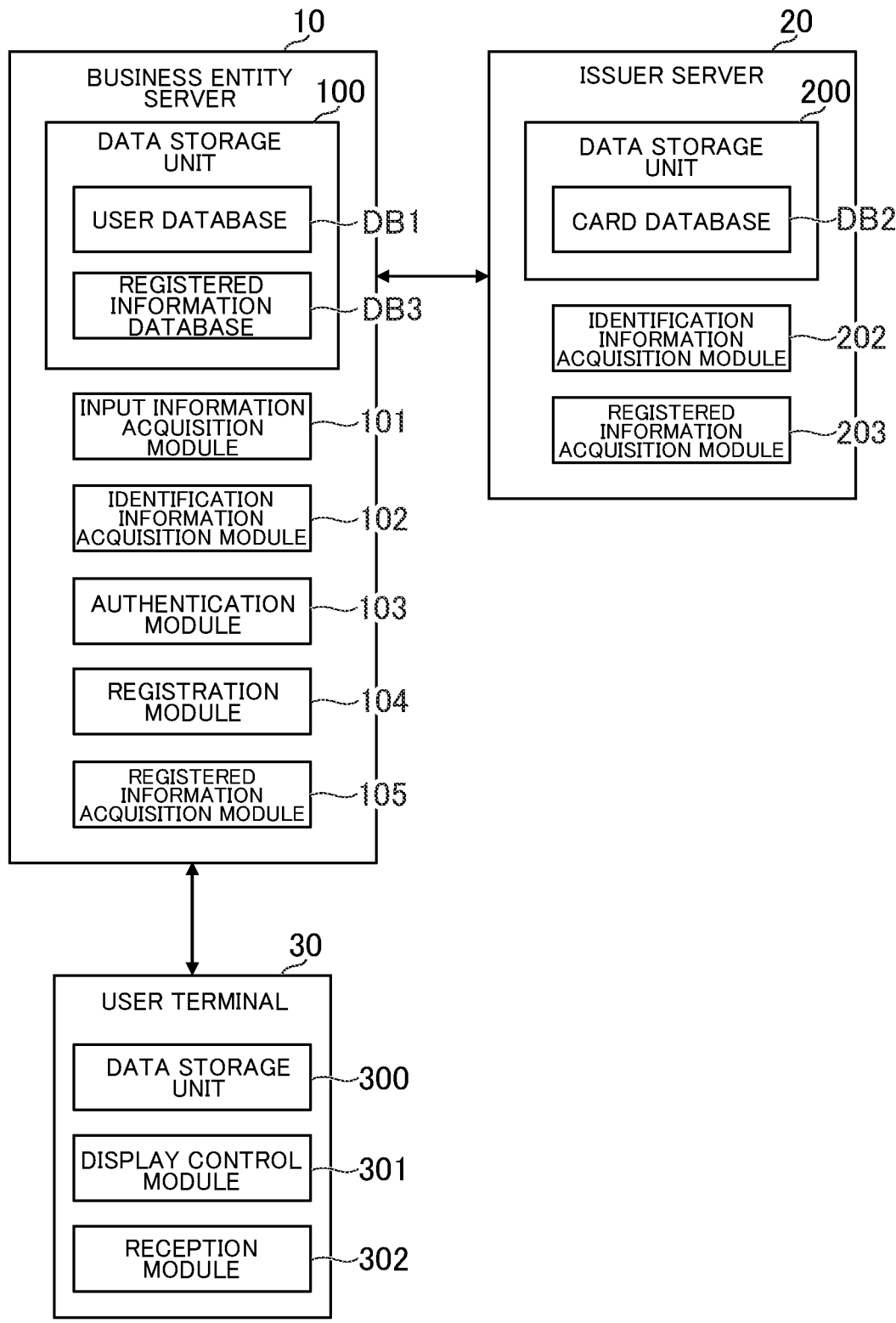
FIG. 10 is a functional block diagram in a second embodiment of the present disclosure.

FIG. 10 is a functional block diagram in the second embodiment. As illustrated in FIG. 10, the business entity server 10 includes the data storage unit 100, the input information acquisition module 101, the identification information acquisition module 102, the authentication module 103, the registration module 104, and a registered information acquisition module 105. The registered information acquisition module 105 is implemented mainly by the control unit 11. The function of the comparison module 204 described in the first embodiment is incorporated in the authentication module 103, and hence the comparison module 204 is not shown in FIG. 10. In addition, the input information acquisition module 201 can be omitted.

The data storage unit 100 in the second embodiment stores a registered information database DB3. The registered information database DB3 is a database for storing at least a pair of the card number and the registered ID number that are included in the card database DB2 described in the first embodiment. The registered information database DB3 corresponds to the card number and the registered ID number that are included in the card database DB2 of FIG. 8, and hence illustration thereof is omitted. The card number may be hashed.

Processing of the registered information acquisition module 105 is also substantially the same as that of the registered information acquisition module 203 in the first embodiment, but the registered information acquisition module 105 acquires the registered ID number from the issuer server 20. For example, the registered information acquisition module 105 stores the registered ID number acquired from the issuer server 20 into the registered information database DB3.

Each time the issuer server 20 issues the card C, the issuer server 20 transmits the card number and the registered ID number to the business entity server 10. When the business entity server 10 receives the card number and the registered ID number, the registered information acquisition module 105 stores a pair of those into the registered information database DB3. The registered information database DB3 may store all the card numbers and registered ID numbers in the card database DB2, or may store a part of the card numbers and registered ID numbers.

The registered information acquisition module 105 may acquire the registered ID number at the time of the authentication instead of storing the registered ID number in the registered information database DB3 in advance. For example, when the card number is acquired by the identification information acquisition module 102, the registered information acquisition module 105 may request the issuer server 20 for the registered ID number of the card C indicated by the card number. The issuer server 20 acquires the registered ID number from the card database DB2, and transmits the registered ID number to the business entity server 10. The registered information acquisition module 105 acquires the registered ID number transmitted by the issuer server 20. In this manner, the registered ID number is dynamically acquired at the time of the authentication, to thereby eliminate requirement for the business entity server 10 to store the registered information database DB3.

Figure 11:
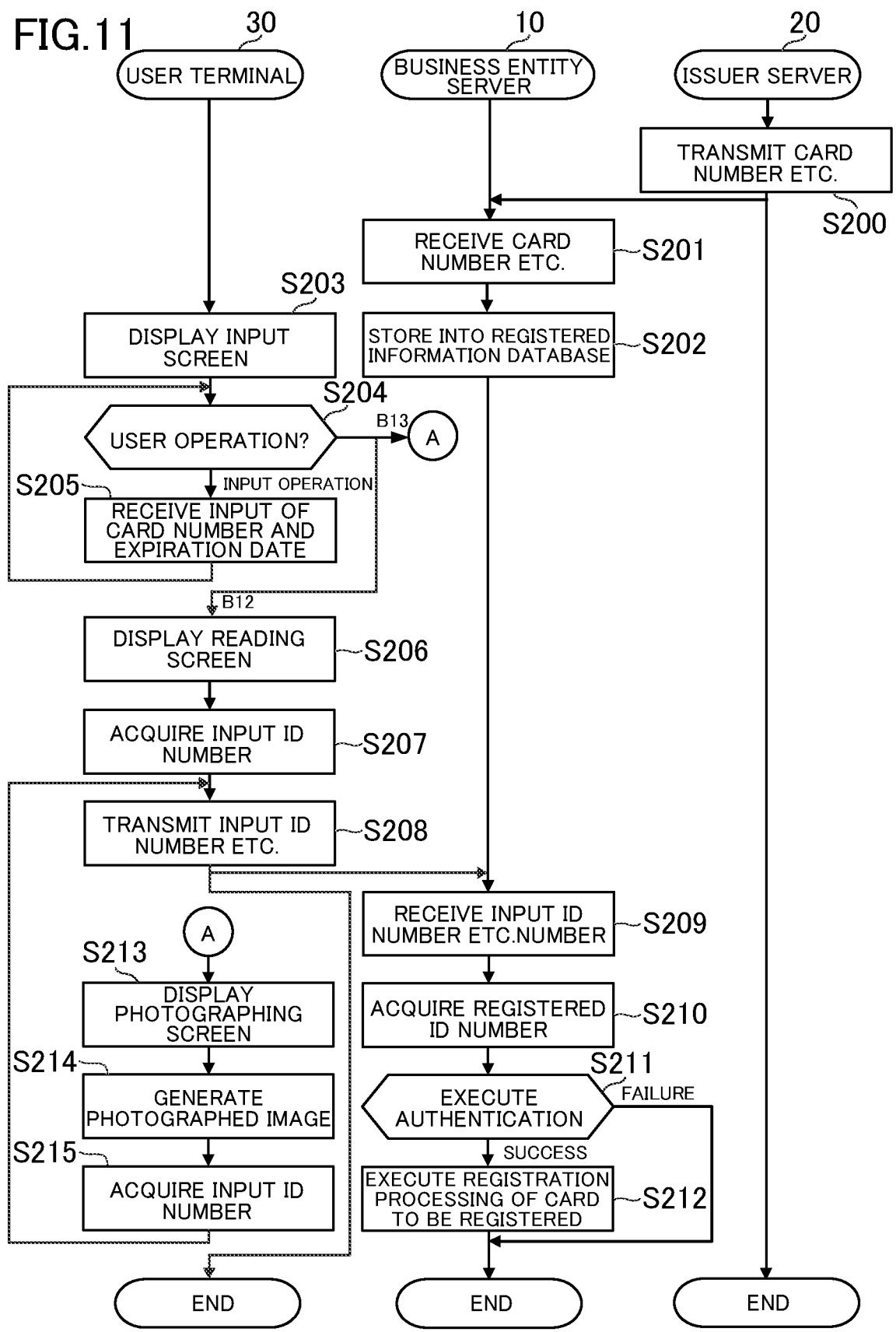
FIG. 11 is a flow chart for illustrating an example of processing to be executed in the second embodiment.

FIG. 11 is a flow chart for illustrating an example of processing to be executed in the second embodiment. As illustrated in FIG. 11, when a new card C is issued, the issuer server 20 transmits the pair of the card number and the registered ID number to the business entity server 10 (Step S200). When the business entity server 10 receives the pair of the card number and the registered ID number (Step S201), the business entity server 10 stores the received pair into the registered information database DB3 (Step S202). The subsequent processing steps of from Step S203 to Step S209 are the same as the processing steps of from Step S100 to Step S106.

The business entity server 10 refers to the registered information database DB3 to acquire the registered ID number associated with the card number received in Step S209 (Step S210). The registered information database DB3 may also store the expiration date, and in Step S210, the business entity server 10 may determine whether or not a record matching the pair of the card number and the expiration date is present in the registered information database DB3. When the record is not present, an error occurs, and this process ends. In this case, at least one of the card number or the expiration date is incomplete, and hence the registration processing is not executed.

The business entity server 10 executes the authentication by comparing the input ID number and the registered ID number to each other (Step S211). The processing step of Step S211 is the same as the processing step of Step S113 executed after the processing step of Step S110 executed by the business entity server 10. The subsequent processing step of Step S212 is the same as that of Step S114. Further, the processing steps of Step S213 to Step S215 are the same as those of Step S115 to Step S117.

According to the second embodiment, the business entity server 10 executes the authentication by comparing the input ID number and the registered ID number to each other, to thereby eliminate requirement to cause the communication between the business entity server 10 and the issuer server 20 after the input ID number is input, and hence it is possible to speed up the authentication. In addition, the issuer server 20 does not execute the comparison between the input ID number and the registered ID number, and hence it is possible to reduce a processing load on the issuer server 20.

3. Modification Examples

The present disclosure is not limited to the embodiments described above, and can be modified suitably without departing from the spirit of the present disclosure.

Figure 12:
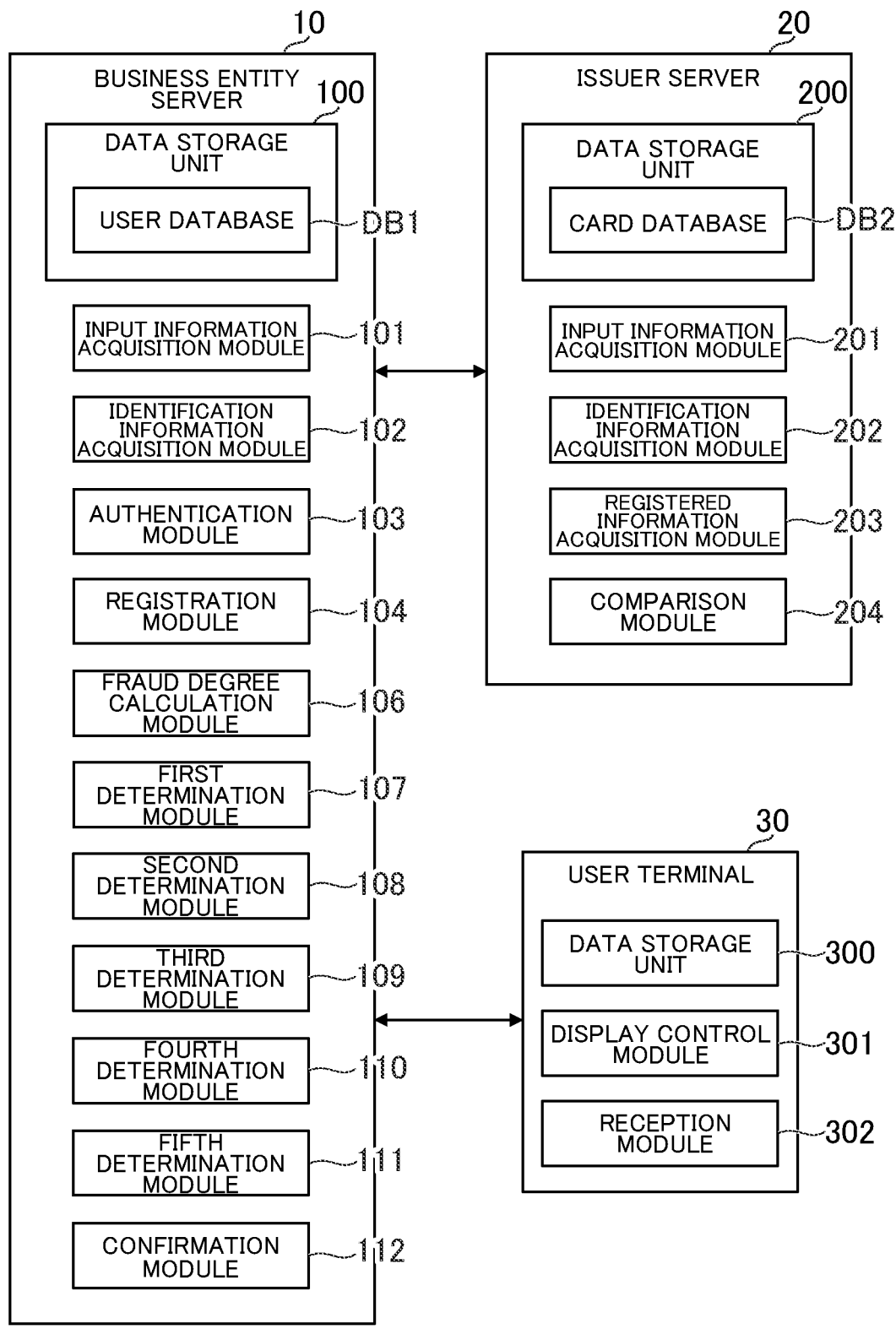
FIG. 12 is a functional block diagram in modification examples of the present disclosure.

FIG. 12 is a functional block diagram in modification examples of the present disclosure. As illustrated in FIG. 12, in the modification examples described below, in addition to the functions described in the embodiments, a fraud degree calculation module 106, a first determination module 107, a second determination module 108, a third determination module 109, a fourth determination module 110, a fifth determination module 111, and a confirmation module 112 are implemented. Each of those functions is implemented mainly by the control unit 11. In FIG. 12, each of the functions is added to the functional blocks of the first embodiment. Each of the functions may be added to the functional blocks of the second embodiment.

(1) For example, the card C may include a first storage area that requires a key for the reading unit to read the first storage area and a second storage area that does not require the key for the reading unit to read the second storage area.

The first storage area is an area of a first address band in a storage unit included in the IC chip cp of the card C. A key is required for access to the first storage area. The key may be stored in the user terminal 30, or may be stored in a server computer accessible to the user terminal 30. The IC chip cp stores a key to be used for the authentication for the access to the first storage area. A CPU included in the IC chip cp executes the authentication based on the key in the IC chip cp and a key received from the NFC unit 33A of the user terminal 30. When the authentication is successful, the access to the first storage area becomes possible.

The second storage area is an area of a second address band in the storage unit included in the IC chip cp of the card C. A key is not required for access to the second storage area. Accordingly, the access to the second storage area is not particularly required to be authenticated.

Each of the first storage area and the second storage area can store any information. For example, the ID number may be recorded in both the first storage area and the second storage area. Further, for example, there may be information stored in the first storage area but not stored in the second storage area. For example, the ID that can identify the IC chip cp may be stored only in the first storage area. In contrast, there may be information stored in the second storage area but not stored in the first storage area. For example, an ID that is not stored in the first storage area may be stored in the second storage area.

The authentication system S according to Modification Example (1) of the present disclosure includes the fraud degree calculation module 106 and the first determination module 107. The fraud degree calculation module 106 calculates the fraud degree of a user based on an action of the user. The fraud degree is information indicating the degree of a fraud or information indicating the level of suspicion of being a fraud. In Modification Example (1), a case in which the fraud degree is expressed by a score is described, but the fraud degree may be expressed by another index. The fraud degree may be expressed by characters, for example, "S rank," "A rank," and "B rank."

For example, the fraud degree calculation module 106 calculates the fraud degree through use of a learning model. The learning model is a model using machine learning (artificial intelligence). As the machine learning itself, it is possible to use various known methods, and it is possible to use a method, for example, a neural network or deep learning. In the learning model, a relationship between an action that can be performed by the user and a determined result of whether or not the action is a fraud has been learned. As the learning model, a model of unsupervised machine learning may be used.

The action is information indicating how the user has used a service. The action can also be said to be details of use of the service or a behavior at a time of use of the service. For example, an IP address of the user terminal 30, a URL accessed by the user terminal 30, a location of the user terminal 30, and an access date/time each correspond to the action of the user. In addition, for example, information on a frequency at which the user has used the service or an amount of money that has been used by the user also corresponds to the action of the user.

It is assumed that data indicating the action of the user is stored in the data storage unit 100. This data is updated each time the user uses the service. The fraud degree calculation module 106 quantifies the action performed until the user displays the input screen G1, and inputs the action to the learning model to acquire the fraud degree output from the learning model. The learning model calculates a feature amount of the input action, and outputs the fraud degree corresponding to the feature amount. The fraud degree calculation module 106 acquires the fraud degree output from the learning model.

For example, the fraud degree calculation module 106 calculates the fraud degree so that the fraud degree becomes higher as the IP address varies more widely. Further, for example, the fraud degree calculation module 106 calculates the fraud degree so that the fraud degree becomes higher as the URL accessed by the user varies more widely. Further, for example, the fraud degree calculation module 106 calculates the fraud degree so that the fraud degree becomes higher as the access location is farther apart from the center of the use or the access location varies more widely.

Further, for example, the fraud degree calculation module 106 calculates the fraud degree so that the fraud degree becomes higher as the access date/time is farther apart from an average access date/time or the access date/time varies more widely. Further, for example, the fraud degree calculation module 106 calculates the fraud degree so that the fraud degree becomes higher as the access frequency is farther apart from the an average access frequency or the access frequency varies more widely.

The fraud degree is only required to be calculated based on a predetermined method, and is not limited to the example using the learning model. For example, the fraud degree calculation module 106 may calculate the fraud degree of the user through use of not the learning model but a rule that defines a relationship between the action of the user and the fraud degree. In this case, the fraud degree calculation module 106 determines whether or not the action of the user matches the rule. When the action matches the rule, the fraud degree associated with the matched rule is obtained. In another case, for example, the fraud degree calculation module 106 may calculate the fraud degree by quantifying the action of the user and substituting the resultant into a predetermined calculation formula.

The first determination module 107 determines a storage area to be used for the authentication from the first storage area and the second storage area based on the fraud degree. For example, the first determination module 107 determines that the first storage area is to be used when the fraud degree is equal to or higher than a threshold value. Further, for example, the first determination module 107 determines that the second storage area is to be used when the fraud degree is lower than the threshold value. The first determination module 107 may determine that both the first storage area and the second storage area are to be used when the fraud degree is equal to or higher than the threshold value. The first determination module 107 transmits information for identifying the storage area to be used for the authentication to the user terminal 30.

The user terminal 30 reads the storage area determined by the first determination module 107. For example, when it is determined that the first storage area is to be read, the user terminal 30 uses the key to read the first storage area. When the key is stored in the user terminal 30, the user terminal 30 uses the stored key to read the first storage area. When the key is stored in the server computer, the user terminal 30 logs in to the server computer and obtains the key.

Further, for example, when the user terminal 30 receives the above-mentioned information and it is determined that the second storage area is to be read, the user terminal 30 reads the second storage area without use of the key. For example, when the ID number is stored in each of the first storage area and the second storage area, the user terminal 30 may transmit, to the business entity server 10, the ID number included in one of the first storage area and the second storage area which has been read. In this case, the user terminal 30 adds information for identifying which storage area the information has been read from.

When it is determined that the first storage area is to be used, the input information acquisition module in Modification Example (1) acquires a first piece of input information, which has been stored in the first storage area, and has been input from the user terminal through use of the NFC unit 33A. When it is determined that the second storage area is to be used, the input information acquisition module acquires a second piece of input information, which has been stored in the second storage area, and has been input from the user terminal through use of the NFC unit 33A. The flow after the ID number has been acquired is as described in the first embodiment and the second embodiment.

It is assumed here that both the first piece of input information and the second piece of input information are ID numbers. The authentication module 103 also assumes, as a condition for the successful authentication, that the ID number has been read from the storage area determined by the first determination module 107. Accordingly, even when some ID number is input, the authentication is not successful unless the ID number has been read from the storage area determined by the first determination module 107. This determination may be executed based on the above-mentioned information received from the user terminal 30.

The first piece of input information read from the first storage area and the second piece of input information read from the second storage area may be different in type from each other. For example, an ID for identifying the IC chip cp itself may be read from the first storage area, and the ID number of the fitness club may be read from the second storage area. In this case, the authentication module 103 also assumes, as a condition for the successful authentication, that a type of information which corresponds to the storage area determined by the first determination module 107 is input. Accordingly, even when some information is input, the authentication is not successful unless the information is information of the type corresponding to the storage area determined by the first determination module 107.

According to Modification Example (1), the storage area to be used for the authentication is determined from the first storage area and the second storage area of the card C based on the fraud degree of the user, to thereby be able to ensure the security corresponding to the fraud degree of the user. It is possible to properly execute the authentication by, for example, executing, when the fraud degree of the user is high, highly accurate authentication using the first storage area that inhibits success without the key even after some time has been taken, and executing, when the fraud degree of the user is low, quick authentication using the second storage area that is not required to be authenticated based on the key. As a result, it is possible to improve convenience of the user while enhancing the security. It is also possible to reduce processing loads on the entire system by dynamically adjusting the authentication depending on the fraud degree of the user.

(2) Further, for example, a unit to be used for the authentication may be determined from the NFC unit 33A and the photographing unit 36 depending on the fraud degree of the user. The authentication system S according to Modification Example (2) of the present disclosure includes the fraud degree calculation module 106 and the second determination module 108 that are the same as those of Modification Example (1). The second determination module 108 determines the unit to be used for the authentication from the NFC unit 33A and the photographing unit 36 based on the fraud degree. The unit to be used for the authentication may be any one of the NFC unit 33A or the photographing unit 36, or may be both the NFC unit 33A and the photographing unit 36.

For example, the second determination module 108 determines that the NFC unit 33A is to be used when the fraud degree is equal to or higher than a threshold value, and determines that the photographing unit 36 is to be used when the fraud degree is lower than the threshold value. In contrast, the second determination module 108 may determine that the photographing unit 36 is to be used when the fraud degree is equal to or higher than the threshold value, and may determine that the NFC unit 33A is to be used when the fraud degree is lower than the threshold value. In addition, for example, the second determination module 108 may determine that both the NFC unit 33A and the photographing unit 36 are to be used when the fraud degree is equal to or higher than the threshold value, and may determine that any one of the NFC unit 33A or the photographing unit 36 is to be used when the fraud degree is lower than the threshold value. The second determination module 108 transmits information for identifying one of the NFC unit 33A and the photographing unit 36 which has been determined to be used for the authentication.

When the user terminal 30 receives the above-mentioned information, the user terminal 30 acquires the ID number through use of the one of the NFC unit 33A and the photographing unit 36 which has been determined by the second determination module 108. The method itself of acquiring the ID number is as described in the first embodiment and the second embodiment. However, the user cannot freely select whether to use the NFC unit 33A or the photographing unit 36, and which one to be used is determined only by the second determination module 108. The user terminal 30 adds, to the ID number, information for identifying which one of the NFC unit 33A and the photographing unit 36 has been used to acquire the ID number, and transmits the ID number to the business entity server 10.

When it is determined that the NFC unit 33A is to be used, the input information acquisition module 101 in Modification Example (2) uses the NFC unit 33A to acquire the input ID number input from the user terminal 30. When it is determined that the photographing unit 36 is to be used, the input information acquisition module 101 uses the photographing unit 36 to acquire the input ID number input from the user terminal 30. The flow after the ID number has been acquired is as described in the first embodiment and the second embodiment.

The authentication module 103 also assumes, as a condition for the successful authentication, that the ID number has been acquired through use of the one of the NFC unit 33A and the photographing unit 36 which has been determined by the second determination module 108. Accordingly, even when some ID number is input, the authentication is not successful unless the ID number has been read from one of the units which has been determined by the second determination module 108. This determination may be executed based on the above-mentioned information received from the user terminal 30.

According to Modification Example (2), the one of the NFC unit 33A and the photographing unit 36 which are to be used for the authentication is determined based on the fraud degree of the user, to thereby be able to ensure the security corresponding to the fraud degree of the user. It is possible to properly execute the authentication by, for example, using the NFC authentication having higher security when the fraud degree of the user is high, and using simpler image authentication when the fraud degree of the user is low. As a result, it is possible to improve the convenience of the user while enhancing the security. It is also possible to reduce the processing loads on the entire system by dynamically adjusting the authentication depending on the fraud degree of the user.

(3) Further, for example, when the card C includes a plurality of types of supplementary information, the supplementary information to be used for the authentication may be determined based on the fraud degree of the user. The authentication system S according to Modification Example (3) of the present disclosure includes the fraud degree calculation module 106, which is the same as that of Modification Example (1), and the third determination module 109. The third determination module 109 determines, based on the fraud degree, the supplementary information to be used for the authentication.

For example, the third determination module 109 determines the supplementary information to be used for the authentication so that the amount of supplementary information to be used for the authentication becomes larger as the fraud degree becomes higher. Further, for example, the third determination module 109 determines the supplementary information to be used for the authentication so that the amount of supplementary information to be used for the authentication becomes smaller as the fraud degree becomes lower. Further, for example, the third determination module 109 determines that a first piece of supplementary information having a relatively large information amount is to be used when the fraud degree is equal to or higher than a threshold value, and determines that a second piece of supplementary information having a relatively small information amount is to be used when the fraud degree is lower than the threshold value. The third determination module 109 transmits information for identifying the supplementary information to be used for the authentication.

When the user terminal 30 receives the above-mentioned information, the user terminal 30 uses the NFC unit 33A or the photographing unit 36 to acquire the supplementary information indicated in the above-mentioned information from the card C. For example, when the supplementary information to be used for the authentication is only the ID number, the user terminal 30 acquires the ID number in the same manner as in the first embodiment and the second embodiment. Further, for example, when other information is included in the supplementary information to be used for the authentication, the user terminal 30 also acquires the other information from the card C. The user terminal 30 transmits the supplementary information determined by the third determination module 109 to the business entity server 10 as the input information.

The input information acquisition module 101 in Modification Example (3) acquires the supplementary information determined by the third determination module 109 as the input information. The flow after the supplementary information has been acquired is as described in the first embodiment and the second embodiment. The authentication module 103 executes the authentication based on the supplementary information determined by the third determination module 109. In this case, it is assumed that the supplementary information being the registered information is stored in advance in the user database DB1, the card database DB2, or the registered information database DB3. When the supplementary information acquired as the input information and the supplementary information registered in advance as the registered information match, the authentication is successful. When those pieces of information do not match, the authentication fails.

According to Modification Example (3), the supplementary information to be used for the authentication is determined based on the fraud degree of the user, to thereby be able to ensure the security corresponding to the fraud degree of the user. It is possible to properly use the supplementary information by, for example, using, when the fraud degree of the user is high, a larger amount of supplementary information for the authentication in order to further enhance the security, and using, when the fraud degree of the user is low, a smaller amount of supplementary information for the authentication so that the authentication becomes quicker and simpler. As a result, it is possible to improve the convenience of the user while enhancing the security. It is also possible to reduce the processing loads on the entire system by dynamically adjusting the authentication depending on the fraud degree of the user.

(4) Further, for example, when the card C includes a plurality of types of supplementary information, the supplementary information to be used for the authentication may be determined based on one of the NFC unit 33A and the photographing unit 36 which has been designated by the user. An authentication system according to Modification Example (4) of the present disclosure includes the fourth determination module 110. The reception module receives designation performed by the user from one of the NFC unit 33A and the photographing unit 36. The selection operation for each of the buttons B12 and B13 is an example of the received designation. The designation may be any operation. It suffices that the user designates at least one of the NFC unit 33A or the photographing unit 36, and both of those units may be designated.

The fourth determination module 110 determines the supplementary information to be used for the authentication based on a result of the designation performed by the user. For example, when the NFC unit 33A is designated, the fourth determination module 110 determines the supplementary information to be used for the authentication so that the amount of supplementary information to be used for the authentication becomes larger than when the photographing unit 36 is designated. In contrast, when the photographing unit 36 is designated, the fourth determination module 110 determines the supplementary information to be used for the authentication so that the amount of supplementary information to be used for the authentication becomes larger than when the NFC unit 33A is designated.

Further, for example, when the NFC unit 33A is designated, the fourth determination module 110 determines the supplementary information to be used for the authentication so that the first piece of supplementary information that is not used when the photographing unit 36 is designated is to be used. In contrast, when the photographing unit 36 is designated, the fourth determination module 110 determines the supplementary information to be used for the authentication so that the first piece of supplementary information that is not used when the NFC unit 33A is designated is to be used. The fourth determination module 110 transmits the information for identifying the supplementary information to be used for the authentication.

When the user terminal 30 receives the above-mentioned information, the user terminal 30 uses the NFC unit 33A or the photographing unit 36 to acquire the supplementary information indicated in the above-mentioned information from the card C. This flow itself is the same as that of Modification Example (3). The user terminal 30 transmits the supplementary information determined by the fourth determination module 110 to the business entity server 10 as the input information.

The input information acquisition module 101 acquires the determined supplementary information as the input information. The flow after the supplementary information has been acquired is as described in the first embodiment and the second embodiment. The authentication module 103 executes the authentication based on the supplementary information determined by the fourth determination module 110. When the supplementary information acquired as the input information and the supplementary information registered in advance as the registered information match, the authentication is successful. When those do not match, the authentication fails. This point is the same as that of Modification Example (3).

According to Modification Example (4), the supplementary information to be used for the authentication is determined based on the one of the NFC unit 33A and the photographing unit 36 which has been designated by the user, to thereby be able to ensure the security corresponding to the designation performed by the user. It is possible to properly use the supplementary information by, for example, using, when the user designates the relatively simple photographing unit 36, a larger amount of supplementary information for the authentication in order to further enhance the security, and using, when the user designates the highly secure NFC unit 33A, a smaller amount of supplementary information so that the authentication becomes quicker and simpler. As a result, it is possible to improve the convenience of the user while enhancing the security.

(5) Further, for example, when the user possesses any one of a plurality of types of cards C, the plurality of types of cards C may each include at least one of a plurality of types of supplementary information. That is, the supplementary information included in the card C may differ in type depending on the type of the card C. In this case, the supplementary information to be used for the authentication may be determined based on the type of the card C of the user.

The authentication system S according to Modification Example (5) of the present disclosure includes the fifth determination module 111. The fifth determination module 111 determines the supplementary information to be used for the authentication based on the type of the card C possessed by the user. For example, when the type of the card C possessed by the user is a first type, the fifth determination module 111 determines the supplementary information that is not used for a second type. It is assumed that a relationship between the type and supplementary information is defined in advance by, for example, data having a table format. The fifth determination module 111 determines, as the supplementary information to be used for the authentication, the supplementary information associated with the type of the card C possessed by the user. The fourth determination module 110 transmits the information for identifying the supplementary information to be used for the authentication.

When the user terminal 30 receives the above-mentioned information, the user terminal 30 uses the NFC unit 33A or the photographing unit 36 to acquire the supplementary information indicated in the above-mentioned information from the card C. This flow itself is the same as those of Modification Example (3) and Modification Example (4). The user terminal 30 transmits the supplementary information determined by the fourth determination module 110 to the business entity server 10 as the input information.

The input information acquisition module 101 acquires the determined supplementary information as the input information. The flow after the supplementary information has been acquired is as described in the first embodiment and the second embodiment. The flow after the supplementary information has been acquired is as described in the first embodiment and the second embodiment. The authentication module 103 executes the authentication based on the supplementary information determined by the fifth determination module 111. When the supplementary information acquired as the input information and the supplementary information registered in advance as the registered information match, the authentication is successful. When those do not match, the authentication fails. This point is the same as those of Modification Example (3) and Modification Example (4).

According to Modification Example (5), the supplementary information to be used for the authentication is determined based on the type of the card possessed by the user, to thereby be able to ensure the security corresponding to the type of the card. For example, the authentication can be executed through use of the supplementary information reliably included in the card possessed by the user. Further, for example, when a fraud frequently occurs with cards of the same type as that of the card possessed by the user, it is possible to enhance the security through use of a larger amount of supplementary information for the authentication in order to further enhance the security.

(6) Further, for example, the business entity server 10 does not simply execute the authentication based on the received ID number, but may confirm whether or not the ID number has been acquired through use of any one of the NFC unit 33A or the photographing unit 36 of the user terminal 30. An authentication system according to Modification Example (6) of the present disclosure includes the confirmation module 112. The confirmation module 112 confirms whether or not the input information has been input through use of any one of the NFC unit 33A or the photographing unit 36 of the user terminal 30.

For example, when the user terminal 30 acquires the ID number of the card C through use of any one of the NFC unit 33A or the photographing unit 36, the user terminal 30 adds, to the ID number, information for identifying which one of the NFC unit 33A and the photographing unit 36 has been used to acquire the ID number, and transmits the ID number to the business entity server 10. The confirmation module 112 refers to the information to perform the confirmation. When this information has not been received, the confirmation module 112 determines that the ID number has been illegally input without use of any one of the NFC unit 33A or the photographing unit 36 of the user terminal 30. When this information has not been received, the confirmation module 112 determines that the valid ID number has been obtained from any one of the NFC unit 33A or the photographing unit 36 of the user terminal 30.

The authentication module 103 in Modification Example (6) executes the authentication further based on a result of the confirmation obtained by the confirmation module 112. The authentication module 103 also assumes, as a condition for the successful authentication, that it has been confirmed that the input information has been input through use of any one of the NFC unit 33A or the photographing unit 36 of the user terminal 30. Accordingly, even when some ID number is input, the authentication is not successful unless the input information has been input through use of any one of the NFC unit 33A or the photographing unit 36 of the user terminal 30.

According to Modification Example (6), it is confirmed whether the ID number has been input through use of any one of the NFC unit 33A or the photographing unit 36 of the user terminal 30, to thereby be able to detect whether or not the ID number has been illegally input by a malicious third party without use of the NFC unit 33A or the photographing unit 36, resulting in enhanced security.

(7) Further, for example, the case in which the authentication system S is applied to the transportation-related service has been described, but the authentication system S can also be applied to services including an electronic payment service, an electronic commerce service, an electronic ticket service, a financial service, a communication service, and a social media service. In this modification example, a case in which the authentication system S is applied to the electronic payment service is described.

In this modification example, a credit card is described as an example of the card C. The card C is not limited to the credit card, and may be any card C that can be used for the electronic payment service. For example, the card C may be a cash card, a debit card, a loyalty card, an electronic money card, or the card C for another electronic value.

The business entity in this modification example is a company that provides an electronic payment service. The issuer is a company that issues a credit card. Accordingly, in this modification example, the business entity and the issuer are different. The business entity and the issuer cooperate with each other, and any data can be transmitted between the business entity server 10 and the issuer server 20. The business entity and the issuer may companies belonging to the same group.

The card database DB2 of the issuer server 20 stores the card information of an issued credit card. For example, the card information includes a credit card number, an expiration date, a full name, and a security code. In the registered image, at least one of the front side or the back side of the credit card has been captured. Each time the issuer issues a credit card, the issuer stores, as the registered ID number, the ID number included in the credit card into the card database DB2 in association with the card information.

The user database DB1 of the business entity server 10 stores the card information of the credit card registered in the app. The app in this modification example is an electronic payment app. The electronic payment app enables electronic payment to be performed by various methods. For example, a user selects a credit card to be used for payment, and causes a bar code or a two-dimensional code to be displayed on the user terminal 30 and to be read by a reader at a shop, to thereby execute the payment using the credit card. In another case, for example, when the photographing unit 36 of the user terminal 30 reads a bar code or a two-dimensional code provided by the shop, payment using a credit card selected by a user is executed. It suffices that the electronic payment app can execute payment using a registered credit card, and the payment method itself is not limited to those examples. For example, the payment using the registered credit card may be executed without particularly using a code.

When the same flow as that of the first embodiment is taken as an example, the user activates the electronic payment app installed on the user terminal 30, and inputs the credit card number and the expiration date on the input screen G1. The user terminal 30 uses the NFC unit 33A or the photographing unit 36 to acquire the input ID number from the credit card. The user terminal 30 transmits the credit card number, the expiration date, and the input ID number to the business entity server 10. The business entity server 10 transfers those pieces of information to the issuer server 20.

The issuer server 20 refers to the card database DB2 to acquire the registered ID number associated with the received credit card number and expiration date. The issuer server 20 compares the input ID number and the registered ID number to each other, and transmits the comparison result to the business entity server 10. The business entity server 10 refers to the comparison result to execute the authentication. When the authentication is successful, the business entity server 10 registers the credit card number and other information in the user database DB1.

In this modification example as well, the registration processing can be performed in the same flow as that of the second embodiment. In this case, the registered information database DB3 of the business entity server 10 stores a pair of the credit card number and the registered ID number. The registered information database DB3 may also store the expiration date. When the business entity server 10 receives the credit card number, the expiration date, and the input ID number, the business entity server 10 refers to the registered information database DB3 to acquire the registered ID number associated with the credit card number and the expiration date. The business entity server 10 compares the input ID number and the registered ID number to each other, to thereby execute the authentication. When the authentication is successful, the business entity server 10 registers the credit card number and other information in the user database DB1.

According to Modification Example (7) of the present disclosure, the security exhibited when a credit card is registered for an electronic payment service is enhanced.

(8) Further, for example, the modification examples described above may be combined.

Further, for example, the authentication system S may use a part of the card information as the supplementary information to compare the card information (for example, the expiration date and the full name) acquired from the card C and the card information (for example, the expiration date and the full name) stored in the card database DB2 to each other, to thereby execute the authentication. When those pieces of information match, the authentication is successful. When those pieces of information do not match, the authentication fails. The comparison therebetween may be executed by the issuer server 20 as in the first embodiment, or may be executed by the business entity server 10 as in the second embodiment.

Further, for example, the card C may be an insurance card, a driver's license, a membership card, a student ID card, or another card. The card C to be utilized for the possession authentication may be an electronic card (virtual card) instead of a physical card. Further, for example, when the authentication fails, the determination may be manually performed by an administrator. Further, for example, when the authentication corresponding to a certain card number fails a predetermined number of times, the card number may be restricted so that no further authentication is executed thereon. In this case, the card number may be restricted so that the card number is not registered in the app unless permission is granted by the administrator.

Further, for example, the authentication performed when the card C is to be registered in the app is taken as an example, but the authentication system S can be applied to the authentication performed in various situations. For example, the authentication system S can also be applied to a situation in which the payment using the card C is executed. In this case, in the situation in which payment is required in the electronic commerce service, the NFC unit 33A or the photographing unit 36 may be used so that the ID number is acquired from the card C to be used for the payment. The authentication system S executes the authentication in the same manner as in the first embodiment or the second embodiment. When the authentication is successful, the payment using the card C may be executed, and when the authentication fails, the payment using the card C may be inhibited from being executed. In addition, for example, the authentication system S may be applied to a situation in which the possession authentication of the card C corresponding to an identification card or another certificate is executed. The authentication system S may be applied to a situation in which the possession authentication of the card C corresponding to an examination card for an online examination is executed.

Further, for example, the case in which the main functions are shared by the business entity server 10 and the issuer server 20 has been described, but each function may be implemented by one computer. Further, for example, the function described as being implemented by the business entity server 10 may be implemented by the issuer server 20. In contrast, the function described as being implemented by the issuer server 20 may be implemented by the business entity server 10. Further, for example, each function may be shared by three or more computers.

The invention claimed is:

1. An authentication system, comprising at least one processor configured to:
   acquire input information, which accompanies a card possessed by a user, and has been input from a user terminal through use of a reader or a camera;
   acquire identification information that enables identification of the card;
   acquire registered information, which accompanies the card, and has been registered in a server in association with the identification information in advance; and
   execute authentication based on the input information and the registered information,
   wherein the card includes:
      a first storage area which requires a key for the reader to read the first storage area, and
      a second storage area which is free from requiring the key for the reader to read the second storage area,
   wherein the at least one processor is further configured to:
      calculate a fraud degree of the user based on an action of the user,
      determine a storage area to be used for the authentication from the first storage area and the second storage area based on the fraud degree,
      acquire, when it is determined that the first storage area is to be used, a first piece of input information, which has been stored in the first storage area, and has been input from the user terminal through use of the reader, and
      acquire, when it is determined that the second storage area is to be used, a second piece of input information, which has been stored in the second storage area, and has been input from the user terminal through use of the reader.

2. The authentication system according to claim 1,
wherein the at least one processor is configured to acquire, as the input information, information for the user to use a first service through use of the card,
wherein the at least one processor is configured to acquire, as the identification information, information for the user to use a second service different from the first service through use of the card, and
wherein the at least one processor is configured to acquire, as the registered information, information for the user to use the first service through use of the card.

3. An authentication system, comprising at least one processor configured to:
acquire input information, which accompanies a card possessed by a user, and has been input from a user terminal through use of a reader or a camera;
acquire identification information that enables identification of the card;
acquire registered information, which accompanies the card, and has been registered in a server in association with the identification information in advance; and
execute authentication based on the input information and the registered information,
wherein the at least one processor is further configured to:
calculate a fraud degree of the user based on an action of the user;
determine which to be used for the authentication from the reader and the camera based on the fraud degree,
acquire, when it is determined that the reader is to be used, the input information which has been input from the user terminal through use of the reader; and
acquire, when it is determined that the camera is to be used, the input information which has been input from the user terminal through use of the camera.

4. An authentication system, comprising at least one processor configured to:
acquire input information, which accompanies a card possessed by a user, and has been input from a user terminal through use of a reader or a camera;
acquire identification information that enables identification of the card;
acquire registered information, which accompanies the card, and has been registered in a server in association with the identification information in advance; and
execute authentication based on the input information and the registered information,
wherein the card includes a plurality of types of supplementary information,
wherein the at least one processor is further configured to:
calculate a fraud degree of the user based on an action of the user;
determine supplementary information to be used for the authentication based on the fraud degree, and
acquire the determined supplementary information as the input information.

5. The authentication system according to claim 1,
wherein the card includes a plurality of types of supplementary information,
wherein the at least one processor is configured to:
receive designation performed by the user from one of the reader and the camera;
determine, based on a result of the designation performed by the user, supplementary information to be used for the authentication, and
acquire the determined supplementary information as the input information.

6. The authentication system according to claim 1,
wherein the user possesses any one of a plurality of types of cards,
wherein the plurality of types of cards each include at least one of a plurality of types of supplementary information,
wherein the at least one processor is configured to determine, based on a type of the card possessed by the user, supplementary information to be used for the authentication, and
wherein the at least one processor is configured to acquire the determined supplementary information as the input information.

7. The authentication system according to claim 1, wherein the at least one processor is configured to confirm whether the input information has been input through use of any one of the reader or the camera of the user terminal,
wherein the at least one processor is configured to execute the authentication further based on a result of the confirmation.

8. The authentication system according to claim 1, further comprising:
a business entity server corresponding to a business entity that provides a service using the card; and
an issuer server corresponding to an issuer that has issued the card,
wherein the issuer server is configured to compare the input information and the registered information to each other, and
wherein the business entity server is configured to acquire a comparison result from the business entity server, and execute the authentication.

9. The authentication system according to claim 1, further comprising:
a business entity server corresponding to a business entity that provides a service using the card; and
an issuer server corresponding to an issuer that has issued the card,
wherein the registered information has been registered in the issuer server, and
wherein the business entity server is configured to acquire the registered information from the issuer server.

10. The authentication system according to claim 1, wherein the at least one processor is configured to execute registration processing relating to the card corresponding to the identification information based on an execution result of the authentication.

* * * * *